US012699774B2

(12) United States Patent
Tiku et al.

(10) Patent No.: US 12,699,774 B2
(45) Date of Patent: Aug. 4, 2026

(54) DETECTION OF ANOMALOUS SEQUENCES OF COMMANDS TO MEMORY SYSTEMS

(71) Applicant: Micron Technology, Inc., Boise, ID (US)

(72) Inventors: Saideep Tiku, Folsom, CA (US); Poorna Kale, Folsom, CA (US)

(73) Assignee: Micron Technology, Inc., Boise, ID (US)

( * ) Notice: Subject to any disclaimer, the term of this patent is extended or adjusted under 35 U.S.C. 154(b) by 219 days.

(21) Appl. No.: 18/487,677

(22) Filed: Oct. 16, 2023

(65) Prior Publication Data

US 2024/0160738 A1 May 16, 2024

Related U.S. Application Data

(60) Provisional application No. 63/383,167, filed on Nov. 10, 2022.

(51) Int. Cl.
| | |
|---|---|
| *G06F 21/56* | (2013.01) |
| *B60W 50/14* | (2020.01) |
| *G06N 3/0442* | (2023.01) |

(52) U.S. Cl.
CPC ........... *G06F 21/566* (2013.01); *B60W 50/14* (2013.01); *G06N 3/0442* (2023.01); *G06F 2221/034* (2013.01)

(58) Field of Classification Search
CPC .................................................... G06N 3/048
See application file for complete search history.

(56) References Cited

U.S. PATENT DOCUMENTS

| | | | | |
|---|---|---|---|---|
| 10,304,515 | B2 * | 5/2019 | Hedden | G11C 29/783 |
| 11,270,756 | B2 * | 3/2022 | Hush | G06F 12/0207 |
| 11,614,937 | B1 * | 3/2023 | Fishel | G06F 9/3001 |
| | | | | 712/222 |
| 2019/0348107 | A1 * | 11/2019 | Shin | G11C 11/40622 |
| 2020/0034686 | A1 * | 1/2020 | Chiu | G06N 3/065 |
| 2023/0143905 | A1 * | 5/2023 | Kim | G11C 11/408 |
| | | | | 365/222 |

OTHER PUBLICATIONS

Joardar et al. "Machine Learning-Based Rowhammer Mitigation" IEEE Transactions on Computer-Aided Design of Integrated Circuits and Systems Sep. 14, 2022 (Year: 2022).*

* cited by examiner

*Primary Examiner* — Douglas King
(74) *Attorney, Agent, or Firm* — Greenberg Traurig

(57) ABSTRACT

A device to detect attacks on a memory system in an advanced driver-assistance system (ADAS) of a vehicle. The device has an interface operable on a memory channel, a random access memory, a non-volatile memory cell array, and a controller configured to detect a trigger event, and in response: identify a sequence of commands received in the interface from the memory channel to access memory services provided via at least the random access memory during ADAS operations; perform operations of multiplication and accumulation using the non-volatile memory cell array to implement computations of an artificial neural network responsive to the sequence of commands as an input to generate a classification of the sequence as an output; and provide the classification via the interface.

20 Claims, 12 Drawing Sheets

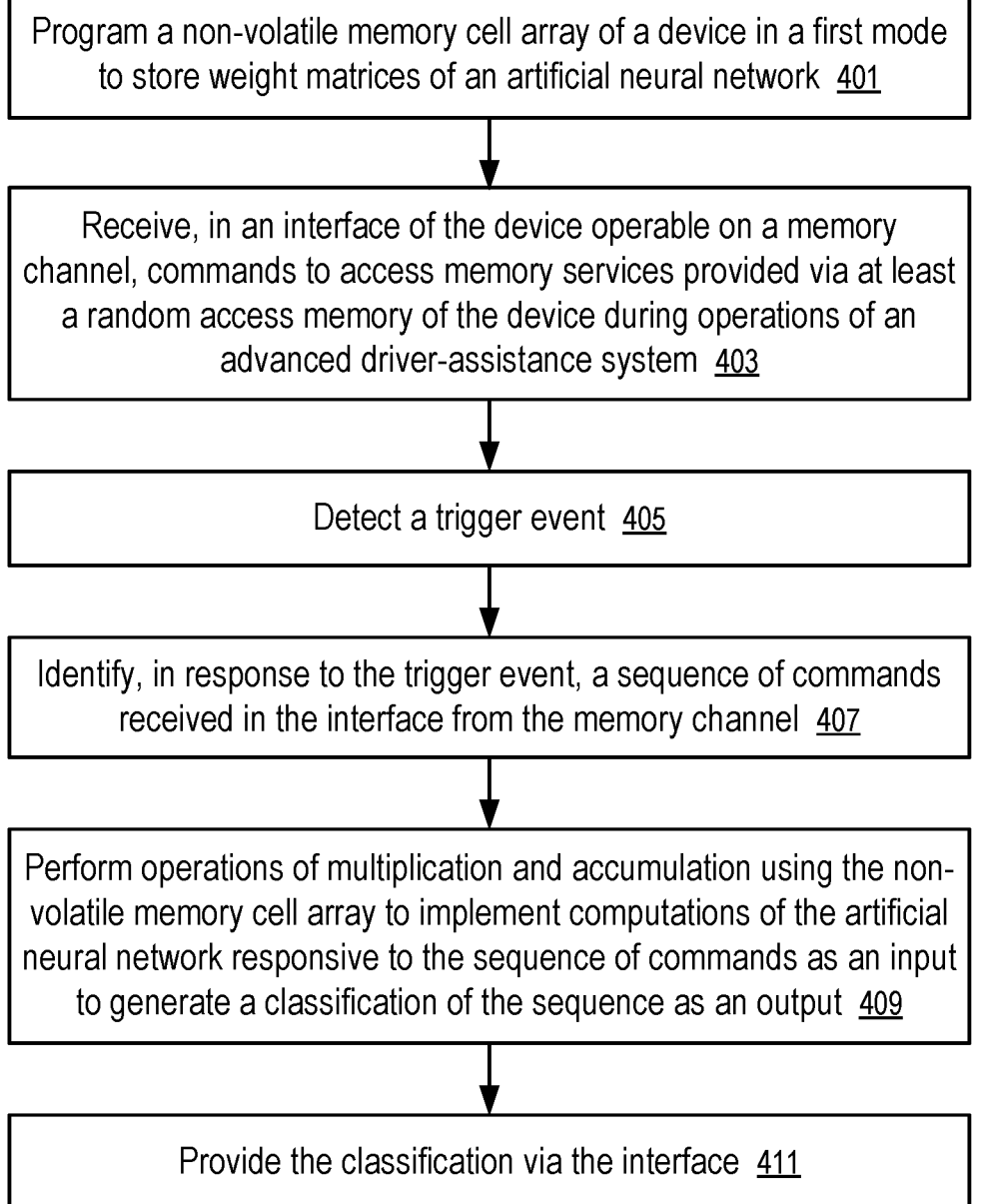

Program a non-volatile memory cell array of a device in a first mode to store weight matrices of an artificial neural network  401

Receive, in an interface of the device operable on a memory channel, commands to access memory services provided via at least a random access memory of the device during operations of an advanced driver-assistance system  403

Detect a trigger event  405

Identify, in response to the trigger event, a sequence of commands received in the interface from the memory channel  407

Perform operations of multiplication and accumulation using the non-volatile memory cell array to implement computations of the artificial neural network responsive to the sequence of commands as an input to generate a classification of the sequence as an output  409

Provide the classification via the interface  411

FIG. 12

DETECTION OF ANOMALOUS SEQUENCES OF COMMANDS TO MEMORY SYSTEMS

RELATED APPLICATIONS

The present application claims priority to Prov. U.S. Pat. App. Ser. No. 63/383,167 filed Nov. 10, 2022, the entire disclosures of which application are hereby incorporated herein by reference.

TECHNICAL FIELD

At least some embodiments disclosed herein relate to security in computing systems in general and more particularly, but not limited to, detection of anomalous sequences of commands sent to memory systems.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

Row hammer is an activity of repeatedly toggling the wordline of a row using an activation command. Such activities can cause deterioration in the integrity of data stored in some types of memory cells, such as dynamic random access memory (DRAM). For example, to read DRAM, an activation command can be used to raise the voltage applied on a wordline and to connect cells on an addressed row to a bitline. Excessive activation commands applied on a row of memory cell stress the effects of inter-cell coupling on nearby rows, causing some of the cells to leak charge at an accelerated rate. If such a cell loses too much charge before it is restored to the original value via a refresh command, it can provide an erroneous result when being read. Hackers or users may deliberately or inadvertently trigger a row hammer attack. For example, row hammer attack can induce multiple bit failures which may not be detected and/or corrected using an error correction code (ECC) technique.

BRIEF DESCRIPTION OF THE DRAWINGS

The embodiments are illustrated by way of example and not limitation in the figures of the accompanying drawings in which like references indicate similar elements.

FIG. 12 shows a method of attack detection according to one embodiment.

DETAILED DESCRIPTION

Figure 1:
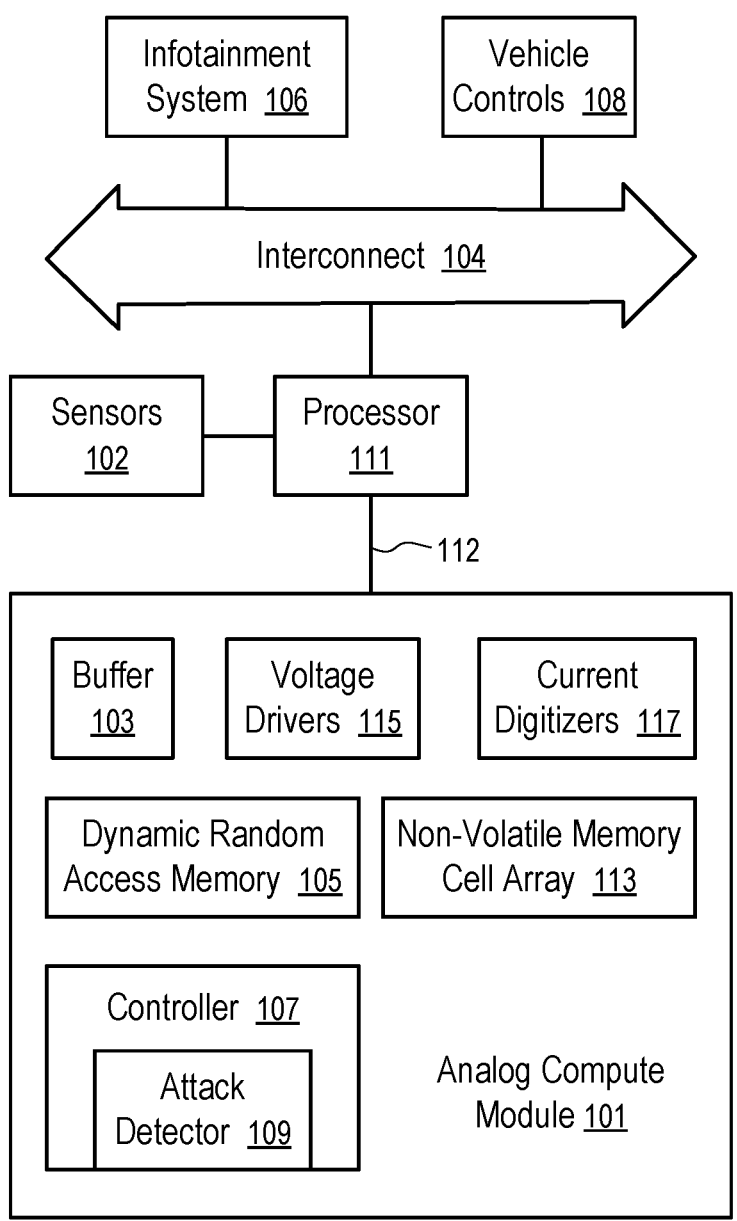
FIG. 1 shows a computing system in a vehicle having an attack detector configured in an analog compute module according to one embodiment.

At least some embodiments disclosed herein provide techniques to detect anomalous sequences of commands via attack detectors implemented in memory systems configured as analog compute modules. Such an analog compute module can include memory cells programmed according to weights and circuits configured to read the memory cells according to inputs in a way resulting multiplication and accumulation applied to the weights and the inputs. A portion of the memory cells can be programmed according to store weights of an artificial neural network model trained to classify a sequence of commands. The classification indicates whether the sequence of commands in the record session is anomalous. In response to a triggering event, a record session of commands received in the analog compute module as a memory system can be applied as an input to the artificial neural network model to obtain a classification of the sequence of commands in the record session.

For example, a processor (e.g., implemented via a system on a chip (Soc)) of an advanced driver-assistance system (ADAS) can be configured to generate information to assist a driver, or perform autonomous driving, based on inputs from sensors configured on a vehicle. Examples of advanced driver-assistance include blind spot monitoring, driver drowsiness detection, driver alertness monitoring, forward collision warning, intelligent speed adaptation, intersection assistance, lane departure warning, parking assistance, wrong-way driver warning, adaptive cruise control, automatic parking, collision avoidance, emergency driver assistance, lane centering, lane change assistance, etc. The processor can use a dynamic random access memory (DRAM) to store sensor data and intermediate results during performance of the computation of an advanced driver-assistance task.

In one embodiment, a memory module configured to provide a dynamic random access memory is replaced with an analog compute module that includes a dynamic random access memory and a deep learning accelerator configured to perform multiplication and accumulation at least in part in an analog form. For example, the deep learning accelerator can include a non-volatile memory cell array programmable in a synapse mode such that when a column of memory cells in the array is read according to a column of inputs, the output currents of the memory cells connected to a bitline in the array corresponds to the summation of the multiplication of the inputs and the weights used to program the memory cells. The summed current in the bitline can be digitized to provide a result in multiplication and accumulation.

An artificial neural network (ANN) can be trained to classify a sequence of commands issued to a dynamic random access memory. Such an artificial neural network can be configured to process a sequence of inputs using a recurrent neural network (RNN), a long short term memory (LSTM) network, an attention-based neural network, etc.

For example, the artificial neural network (ANN) can be trained using known sequences of attacks (e.g., row hammer attacks, or other types of attacks) to recognize the pattern of command sequences that are classified as known attacks. Alternatively, or in combination, the artificial neural network (ANN) can be trained using known sequences of normal usages of the artificial neural network (ANN) that are not attacks (e.g., row hammer attacks) to recognize the pattern of normal command sequences that are classified as known non-attacks. When a new sequence of commands that is not recognized as known non-attacks, the artificial neural network (ANN) can identify the sequence as anomaly. In response to an anomalous command sequence (e.g., a known attack or an unknown anomaly), the advanced driver-assistance system (ADAS) can generate a warning or alert to a driver, and optionally perform an operation to reduce risks, such as limiting inputs/commands from a remote location, limiting to a set of trusted components in accessing the analog compute module, increasing the rate to refresh the dynamic random access memory, reducing the rate of commands to the analog compute module, bringing the vehicle to a safe stop, etc.

In some implementations, the artificial neural network (ANN) is used to evaluate selected sequences of commands. Instead of running the computations of the artificial neural network (ANN) against all possible sequences of commands, an application is configured to detect a trigger event based on simpler signals, such as the utilization rate of a memory channel connected to the dynamic random access memory. For example, when the utilization rate is below a threshold, the memory system can be considered in a safe state; and the computation of the artificial neural network (ANN) to classify a sequence of commands is not performed. However, when the utilization rate is above the threshold, the computation of the artificial neural network (ANN) is triggered; and a record session of commands is created and provided as input to the artificial neural network (ANN) to determine a classification of the sequence of commands in the record session. When the utilization rate drops below the threshold, the computation of the artificial neural network (ANN) can be stopped; and the classification of normal operation can be assumed.

FIG. 1 shows a computing system in a vehicle having an attack detector configured in an analog compute module according to one embodiment.

In FIG. 1, the computing system configured in a vehicle (e.g., automobile) has a processor 111, an infotainment system 106, and vehicle controls 108 connected via an interconnect 104.

The processor 111 is configured to process the input data from sensors 102 (e.g., cameras, radars, lidars, sonars) to provide advanced driver-assistance via an infotainment system 106 and optionally the vehicle controls 108.

The vehicle controls 108 can include a control for steering, a control for acceleration, a control for braking, etc. The processor 111 can use the vehicle controls 108 in providing some types of advanced driver-assistance, such as lane centering, intelligent speed adaptation, adaptive cruise control, automatic parking, emergency driver assistance, autonomous driving, etc.

The processor 111 can use the infotainment system 106 to present alerts, warnings, instructions, information, etc. to a driver in providing some types of advanced driver-assistance, such as blind spot monitoring, driver drowsiness detection, driver alertness monitoring, forward collision warning, intersection assistance, lane departure warning, parking assistance, wrong-way driver warning, collision avoidance, lane change assistance, etc.

During the processing of the input data from the sensors 102, the processor 111 can send commands over a memory channel 112 (e.g., a memory bus) to fetch instructions, and store data into and retrieve data from an analog compute module 101 configured to provide at least memory services in the computing system.

The analog compute module 101 can include a buffer 103 to record commands received via the processor 111, before a controller 107 applies the commands to a dynamic random access memory (DRAM) 105, the non-volatile memory cell array 113, or both. For example, the buffer 103 can be configured as a first-in first-out (FIFO) buffer. Alternatively, the commands can be applied directly to the dynamic random access memory 105 without the buffer 103; and the controller 107 can optionally store a record session of commands, received via the memory channel 112, in a reserved region in the dynamic random access memory 105 (or in the non-volatile memory cell array 113).

The non-volatile memory cell array 113 in the analog compute module 101 is programmable in a synapse mode to store weight data for multiplication and accumulation operations, as further discussed in connection with FIG. 7, FIG. 8, and FIG. 9. The analog compute module 101 has voltage drivers 115 and current digitizers 117. During multiplication and accumulation operations, the controller 107 uses the voltage drivers 115 to apply read voltages, according to input data, onto wordlines connected to memory cells programmed in the synapse mode to generate currents representative of results of multiplications between the weight data and the input data. The currents are summed in an analog form in bitlines connected to the memory cells programmed in the synapse mode. The current digitizers 117 convert the currents summed in bitlines to digital results.

Optionally, a portion of the non-volatile memory cell array 113 can be programmed in a storage mode to store data. Memory cells programmed in the storage mode can have better performance in data storage and data retrieval than memory cells programmed in the synapse mode, but can lack the support for multiplication and accumulation operations.

In some implementations, a portion of the non-volatile memory cell array 113 can be programmed in a storage mode (e.g., in a single level cell (SLC) mode) to provide the memory function of the dynamic random access memory 105; and in such implementations, the dynamic random access memory 105 can be eliminated from the analog compute module 101.

In some implementations, the sensors 102 (and other components, such as the infotainment system 106) have access to the memory channel 112 to write input data into the analog compute module 101 without going through the processor 111.

When the processor 111 writes data into a predefined region of memory addresses, the controller 107 uses the data as weight data to program a region of the non-volatile memory cell array 113 in the synapse mode. When the processor 111 writes input data into another predefined region of memory addresses, the controller 107 uses the input data to read the region of the non-volatile memory cell array 113, programmed in the synapse mode to store the weight data, to obtain the results of multiplication and accumulation applied to the weight data and the input data. The controller 107 can store the results in a further predefined region of memory addresses; and the processor 111 can read the results from the further predefined region of memory addresses. Thus, the processor 111 can use the analog compute module 101 as an accelerator for multiplication and accumulation by writing data into predefined address regions and reading results from associated address regions.

Optionally, the processor 111 can use the multiplication and accumulation capability of the analog compute module 101 in performing the computation tasks of advanced driver-assistance.

Optionally, the controller 107 of the analog compute module 101 can be further configured (e.g., via instructions) to perform the computation of an artificial neural network. For example, the processor 111 can write instructions for the computation of the artificial neural network to a predefined address region configured for instructions for computations of the artificial neural network, the weight data of the artificial neural network to a predefined address region configured for weight data, and input data to the artificial neural network to a predefined address region configured for input. The controller 107 can execute the instructions to store the outputs of the artificial neural network to a predefined address region for output. Thus, the processor 111 can use the analog compute module 101 as a co-processor for perform the computations of an artificial neural network.

In FIG. 1, the controller 107 of the analog compute module 101 is configured with an attack detector 109. The attack detector 109 is configured to perform the computation of an artificial neural network (ANN) trained to classify a sequence of commands, received via the memory channel 112, using the multiplication and accumulation capability of the analog compute module 101. Alternatively, the processor 111 can run the attack detector 109 using the multiplication and accumulation capability of the analog compute module 101.

For example, the artificial neural network (ANN) can include a recurrent neural network (RNN), a long short term memory (LSTM) network, an attention-based neural network, etc. that are adapted to analyze a sequence of inputs. A collection of known sequences of commands of attacks of known types (e.g., row hammer attack), and known sequences of commands of normal operations can be used to train the artificial neural network (ANN) to classify a given sequence of commands as one of the known attack types, a type of normal operations, or a type of anomalous operations of an unknown type. A portion of the non-volatile memory cell array 113 can be programmed in the synapse mode to store the weight data of the artificial neural network (ANN); and the attack detector 109 can be configured to perform the computations of the artificial neural network (ANN) using the portion of the non-volatile memory cell array 113.

When the attack detector 109 determines that a sequence of command received via the memory channel 112 has the classification of a known attack type, or a type of anomalous operations of an unknown type, the processor 111 can generate an alert or warning via the infotainment system 106, change a pattern of usage of the analog compute module 101 (e.g., memory refreshing rate, memory accessing rate), and optionally operate the vehicle controls 108 to reduce the risk or threat of an accident (e.g., by reducing the speed of the vehicle, bringing the vehicle to a stop safely). Optionally, the processor 111 can restrict access to the analog compute module 101 by other components, or reduce the rate of commands being transmitted to the analog compute module 101, or both.

Figure 2:
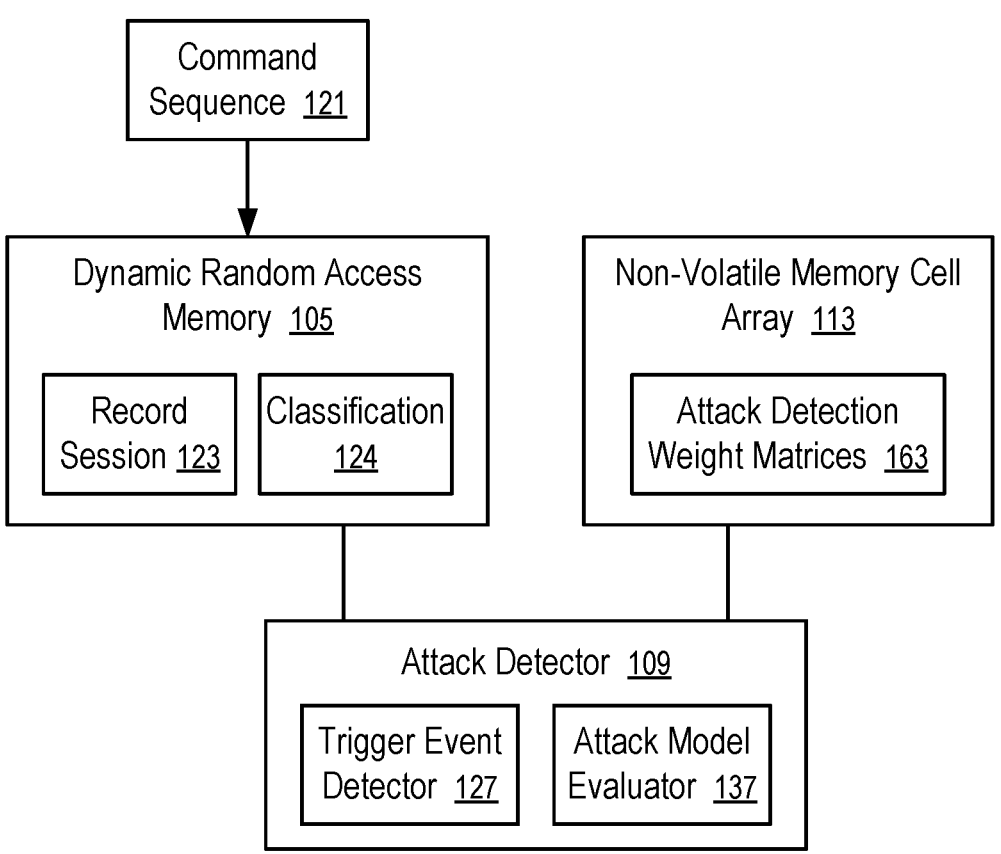
FIG. 2 shows an attack detector according to one embodiment.

FIG. 2 shows an attack detector according to one embodiment. For example, the attack detector 109 of FIG. 1 can be configured in a way as illustrated in FIG. 2.

In FIG. 2, a command sequence 121 is received in an analog compute module 101 over a memory channel 112 (e.g., as in FIG. 1). For example, the command sequence 121 can be used by the processor 111 to use the memory services and optional multiplication and accumulation services, offered by the analog compute module 101, during the processing of input data from sensors 102 for one or more advanced driver-assistance operations in a vehicle.

The attack detector 109 can include a trigger event detector 127. The trigger event detector 127 can operate based on measurements of an operating parameter of the memory channel 112 to determine whether to run an attack model evaluator 137. An example of the operating parameter is the utilization rate of the memory channel 112. Another example of the operating parameter is the rate of activation commands in the memory channel 112 addressed to a region of memory addresses. A further example of the operating parameter is the rate of commands of a particular type in the memory channel 112 addressed to a region of memory addresses. When the operating parameter is below a threshold, it can be safe to assume that there is no attack; and the attack detector 109 can skip using the attack model evaluator 137.

When the operating parameter is above the threshold, the attack detector 109 can generate a record session 123 of the command sequence 121. In FIG. 2, the record session 123 is configured in the dynamic random access memory 105. Alternatively, the record session 123 can be configured in a buffer 103 of the analog compute module 101, or in the non-volatile memory cell array 113.

The command sequence 121 captured in the record session 123 can be used as an input to an artificial neural network (ANN) trained to classify whether the command sequence 121 is one of the known attack types, or a type of normal operations, or a type of anomalous operations of an unknown type. A portion of the non-volatile memory cell array 113 can be programmed in a synapse mode to store attack detection weight matrices 163 of the artificial neural network (ANN). The attack model evaluator 137 uses the multiplication and accumulation capability provided by the portion of the non-volatile memory cell array 113 in performing the computation of the artificial neural network (ANN) to generate a classification 124 of the command sequence 121 captured in the record session 123.

In some implementations, the attack detector 109 is implemented entirely in the analog compute module 101; and the classification 124 of the command sequence 121 captured in the record session 123 can be determined without assistance from a processor (e.g., 111) outside of the analog compute module 101. The attack detector 109 can store the classification 124 at a predetermined address; and the processor (e.g., 111) can read the content from the predetermined address periodically to obtain the current classification 124, or in response to a signal from the analog compute module 101. Optionally, the processor 111 can read the record session 123. Optionally, the attack detector 109 can store a command sequence 121 having a classification 124 of a type of known attack, or a type of anomalous operations, to a portion of the non-volatile memory cell array 113 in a storage mode (e.g., a multi-level cell (MLC) mode, a triple level cell (TLC) mode, a quad-level cell (QLC) mode, and a penta-level cell (PLC) mode) to facilitate incident analyses.

Alternatively, at least a portion of the attack detector 109 can be implemented using the computing power of a processor (e.g., 111) outside of the analog compute module 101. The processor (e.g., 111) can run an application that uses the analog compute module 101 to perform multiplication and accumulation operations in the computation of the artificial neural network and performs further other operations involved in the computation of the artificial neural network using the processor (e.g., 111).

Figure 3:
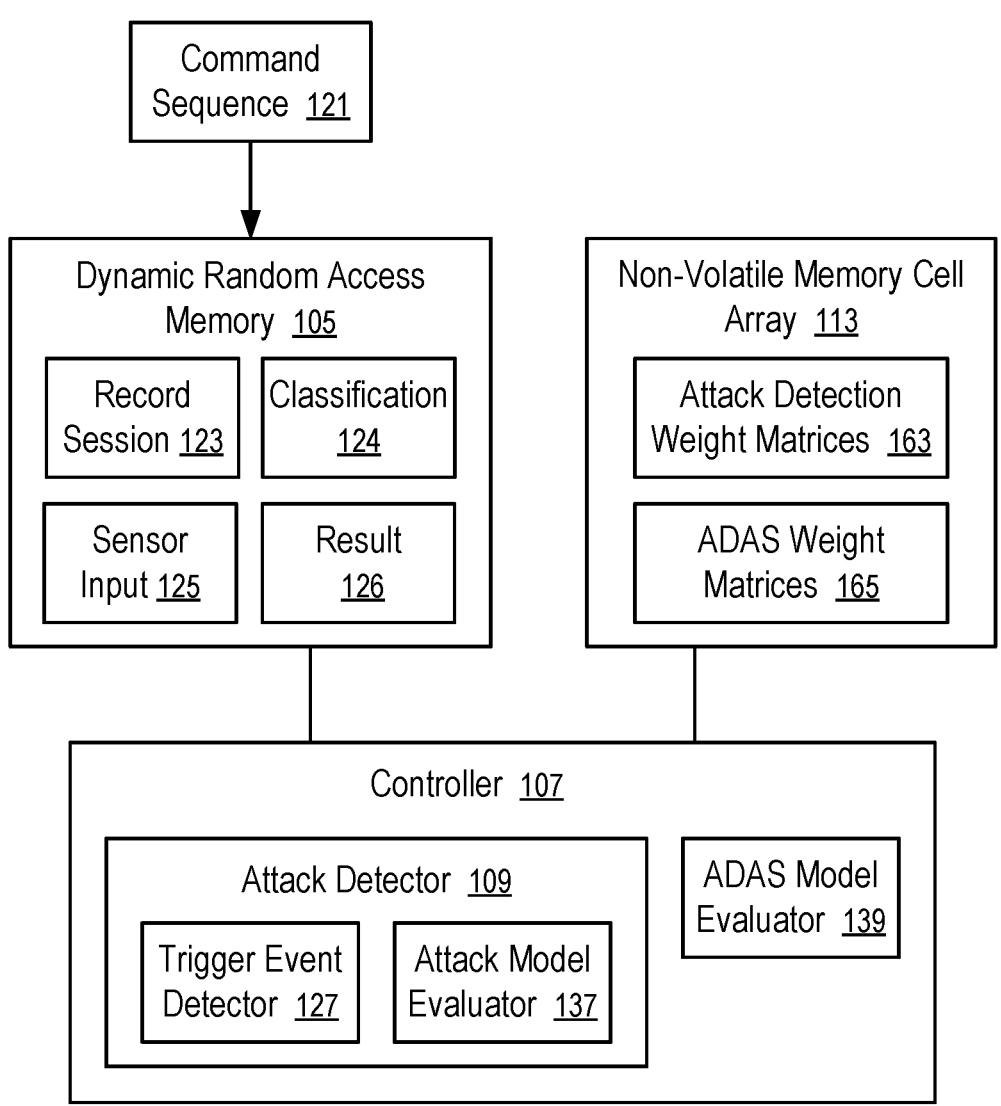
FIG. 3 shows a controller of an analog compute module having an attack detector according to one embodiment.

FIG. 3 shows a controller of an analog compute module having an attack detector according to one embodiment. For example, the controller 107 of FIG. 1 can be configured in a way as illustrated in FIG. 3.

In FIG. 3, the controller 107 includes an attack detector 109 (e.g., as in FIG. 2) and an ADAS model evaluator 139. A portion of the non-volatile memory cell array 113 can be programmed in the synapse mode to store the weight matrices 165 used in the computations of one or more advanced driver-assistance tasks. The command sequence 121 from a processor 111 outside of the analog compute module 101 can write sensor input 125 into the dynamic random access memory 105 at a location pre-associated with the location of the ADAS weight matrices 165. In response, the ADAS model evaluator 139 can apply the input 125 to the ADAS weight matrices 165 to generate a result 126 of multiplication and accumulation. The controller 107 stores the result 126 at a location in the dynamic random access memory 105 in association with the sensor input 125. Thus, a processor (e.g., 111) outside of the analog compute module 101 can use the analog compute module 101 to perform the multiplication and accumulation of the operation applied to the sensor input 125 and the ADAS weight matrices 165 by writing the sensor input 125 and reading the result 126.

In some implementations, the ADAS model evaluator 139 includes a logic circuit configured to perform the operations of an artificial neural network (ANN) using the portion of the non-volatile memory cell array 113 programmed according to the ADAS weight matrices 165. Thus, the result 126 can represent the output the artificial neural network (ANN). Alternatively, the ADAS model evaluator 139 is configured to evaluate the multiplication and accumulation operation applied to the sensor input 125 and the ADAS weight matrices 165; and the result 126 of the multiplication and accumulation operation can be used by a processor (e.g., 111) outside of the analog compute module 101 to perform further computations, generate further inputs to be applied to weight matrices, etc. in performing the computation of an artificial neural network (ANN).

Figure 4:
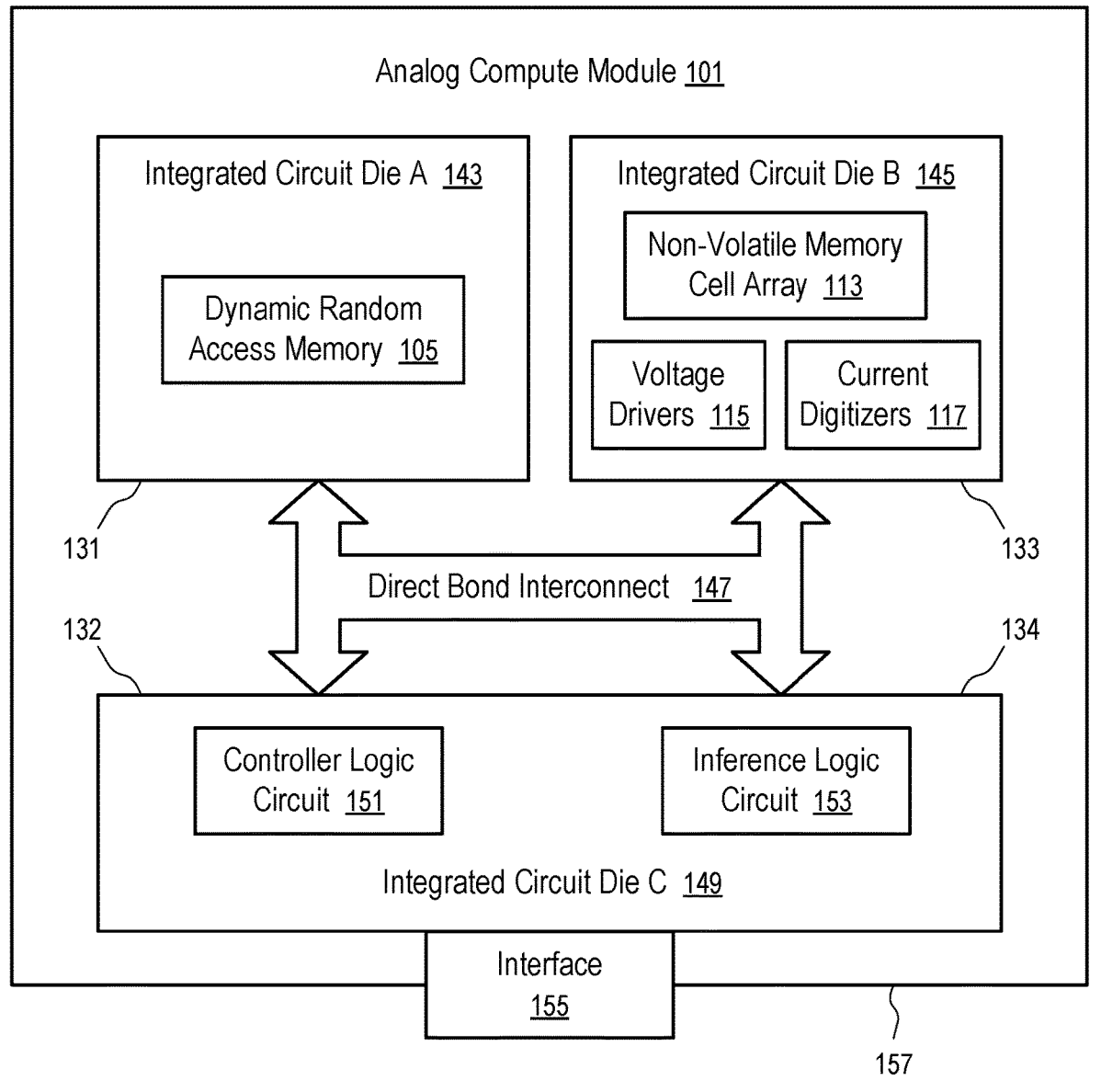
FIG. 4 shows an analog compute module having a dynamic random access memory, a non-volatile memory cell array, and circuits to perform inference computations according to one embodiment.

FIG. 4 shows an analog compute module having a dynamic random access memory, a non-volatile memory cell array, and circuits to perform inference computations according to one embodiment.

For example, the analog compute module 101 of FIG. 1 can be implemented as an integrated circuit device illustrated in FIG. 4.

In FIG. 4, the analog compute module 101 has an integrated circuit die 149 having logic circuits 151 and 153, an integrated circuit die 143 having the dynamic random access memory 105, and an integrated circuit die 145 having a non-volatile memory cell array 113.

The integrated circuit die 149 having logic circuits 151 and 153 can be considered a logic chip; the integrated circuit die 143 having the dynamic random access memory 105 can be considered a dynamic random access memory chip; and the integrated circuit die 145 having the memory cell array 113 can be considered a synapse memory chip.

In FIG. 4, the integrated circuit die 145 having the memory cell array 113 further includes voltage drivers 115 and current digitizers 117. The memory cell array 113 are connected such that currents generated by the memory cells in response to voltages applied by the voltage drivers 115 are summed in the array 113 for columns of memory cells (e.g., as illustrated in FIG. 7 and FIG. 8); and the summed currents are digitized to generate the sum of bit-wise multiplications. The inference logic circuit 153 can be configured to instruct the voltage drivers 115 to apply read voltages according to a column of inputs, perform shifts and summations to generate the results of a column or matrix of weights multiplied by the column of inputs with accumulation.

Optionally, the inference logic circuit 153 can include a programmable processor that can execute a set of instructions to control the inference computation. Alternatively, the inference computation is configured for a particular artificial neural network with certain aspects adjustable via weights stored in the memory cell array 113. Optionally, the inference logic circuit 153 is implemented via an application-specific integrated circuit (ASIC), a field-programmable gate array (FPGA), or a core of a programmable microprocessor.

In FIG. 4, the integrated circuit die 145 having the memory cell array 113 has a bottom surface 133; and the integrated circuit die 149 having the inference logic circuit 153 has a portion of a top surface 134. The two surfaces 133 and 134 can be connected via hybrid bonding to provide a portion of a direct bond interconnect 147 between the metal portions on the surfaces 133 and 134.

Direct bonding is a type of chemical bond between two surfaces of material meeting various requirements. Direct bonding of wafers typically includes pre-processing wafers, pre-bonding the wafers at room temperature, and annealing at elevated temperatures. For example, direct bonding can be used to join two wafers of a same material (e.g., silicon); anodic bonding can be used to join two wafers of different materials (e.g., silicon and borosilicate glass); eutectic bonding can be used to form a bonding layer of eutectic alloy based on silicon combining with metal to form a eutectic alloy.

Hybrid bonding can be used to join two surfaces having metal and dielectric material to form a dielectric bond with an embedded metal interconnect from the two surfaces. The hybrid bonding can be based on adhesives, direct bonding of a same dielectric material, anodic bonding of different dielectric materials, eutectic bonding, thermocompression bonding of materials, or other techniques, or any combination thereof.

Copper microbump is a traditional technique to connect dies at packaging level. Tiny metal bumps can be formed on dies as microbumps and connected for assembling into an integrated circuit package. It is difficult to use microbumps for high density connections at a small pitch (e.g., 10 micrometers). Hybrid bonding can be used to implement connections at such a small pitch not feasible via microbumps.

The integrated circuit die 143 having the dynamic random access memory 105 has a bottom surface 131; and the integrated circuit die 149 having the inference logic circuit 153 has another portion of its top surface 132. The two surfaces 131 and 132 can be connected via hybrid bonding to provide a portion of the direct bond interconnect 147 between the metal portions on the surfaces 131 and 132.

The integrated circuit die 149 can include a controller logic circuit 151 configured to control the operations of the analog compute module 101, such as the execution of commands in a sequence 121 received from a memory channel 112, the operations of a trigger event detector 127, and optionally the operations of an attack model evaluator 137 that uses the multiplication and accumulation function provided via the memory cell array 113.

In some implementations, the direct bond interconnect 147 includes wires for writing data from the dynamic random access memory 105 to a portion of the memory cell array 113 (e.g., for storing in a synapse mode or a storage mode).

The inference logic circuit 153 can buffer the result of inference computations in a portion of the dynamic random access memory 105.

In some implementations, a buffer 103 is configured in the integrated circuit die 149.

The interface 155 of the analog compute module 101 can be configured to support a memory access protocol, or a storage access protocol, or both. Thus, an external device (e.g., a processor 111, a central processing unit) can send commands to the interface 155 to access the storage capacity provided by the dynamic random access memory 105 and the memory cell array 113.

For example, the interface 155 can be configured to support a connection and communication protocol on a computer bus, such as a compute express link, a memory bus, a peripheral component interconnect express (PCIe) bus, a serial advanced technology attachment (SATA) bus, a universal serial bus (USB) bus, etc. In some embodiments, the interface 155 can be configured to include an interface of a solid-state drive (SSD), such as a ball grid array (BGA) SSD. In some embodiments, the interface 155 is configured to include an interface of a memory module, such as a double data rate (DDR) memory module, a dual in-line memory module, etc. The interface 155 can be configured to support a communication protocol such as a protocol according to non-volatile memory express (NVMe), non-volatile memory host controller interface specification (NVMHCIS), etc.

The analog compute module 101 can appear to be a memory sub-system from the point of view of a device in communication with the interface 155. Through the interface 155 an external device (e.g., a processor 111, a central processing unit) can access the storage capacity of the dynamic random access memory 105 and the memory cell array 113. For example, the external device can store and update weight matrices and instructions for the inference logic circuit 153, retrieve results generated in the dynamic random access memory 105 by the logic circuits 151 and 153, etc.

Figure 5:
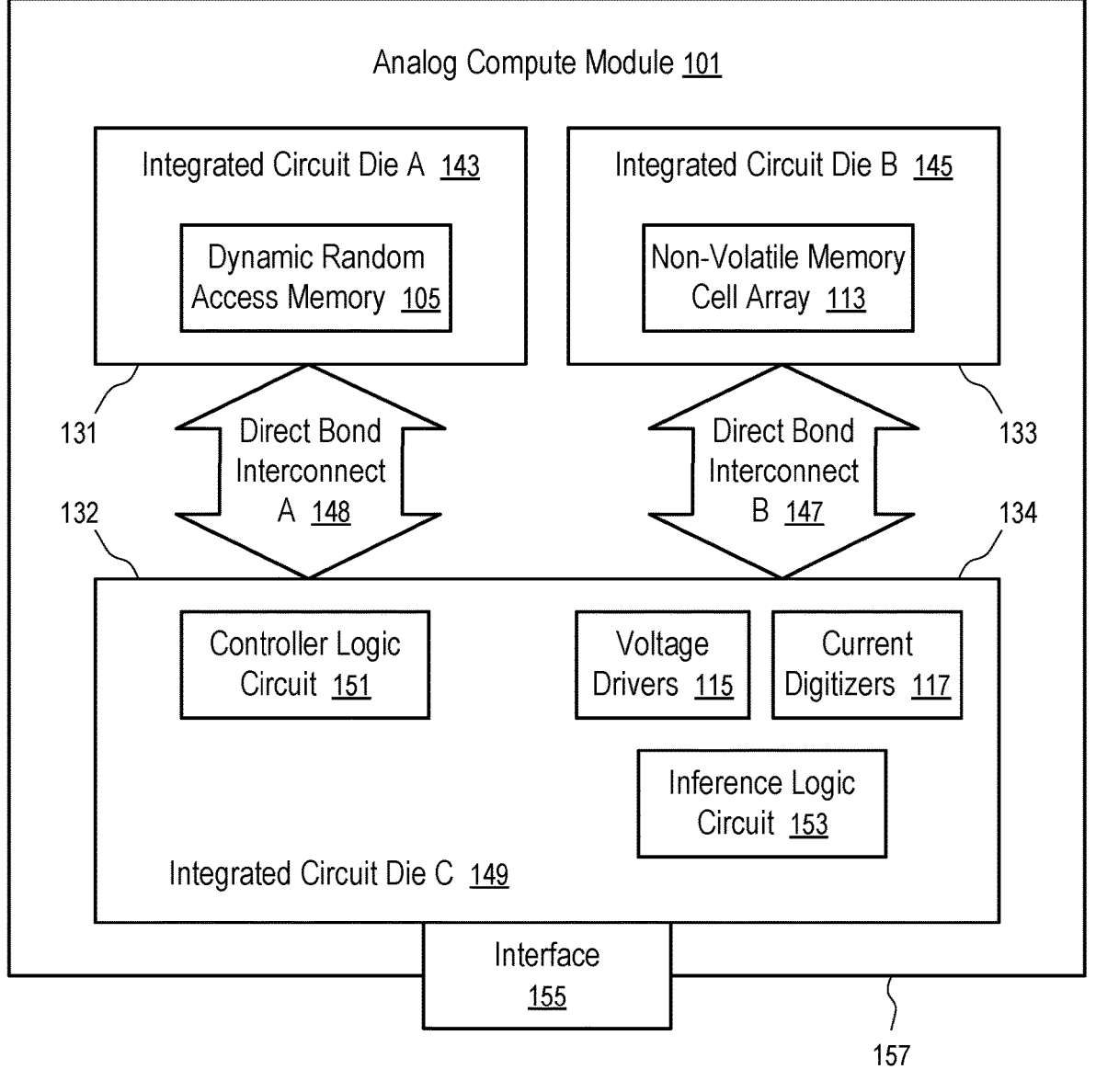
FIG. 5 and FIG. 6 illustrate different configurations of analog compute modules according to some embodiments.

In some implementations, some of the circuits (e.g., voltage drivers 115, or current digitizers 117, or both) are implemented in the integrated circuit die 149 having the inference logic circuit 153, as illustrated in FIG. 5.

In FIG. 4, the dynamic random access memory chip and the synapse memory chip are placed side by side on the same side (e.g., top side) of the logic chip. Alternatively, the dynamic random access memory chip and the synapse memory chip can be placed on different sides (e.g., top surface and bottom surface) of the logic chip, as illustrated in FIG. 6.

The analog compute module 101 can include an integrated circuit package 157 configured to enclose at least the integrated circuit dies 143, 145, and 149.

Figure 6:
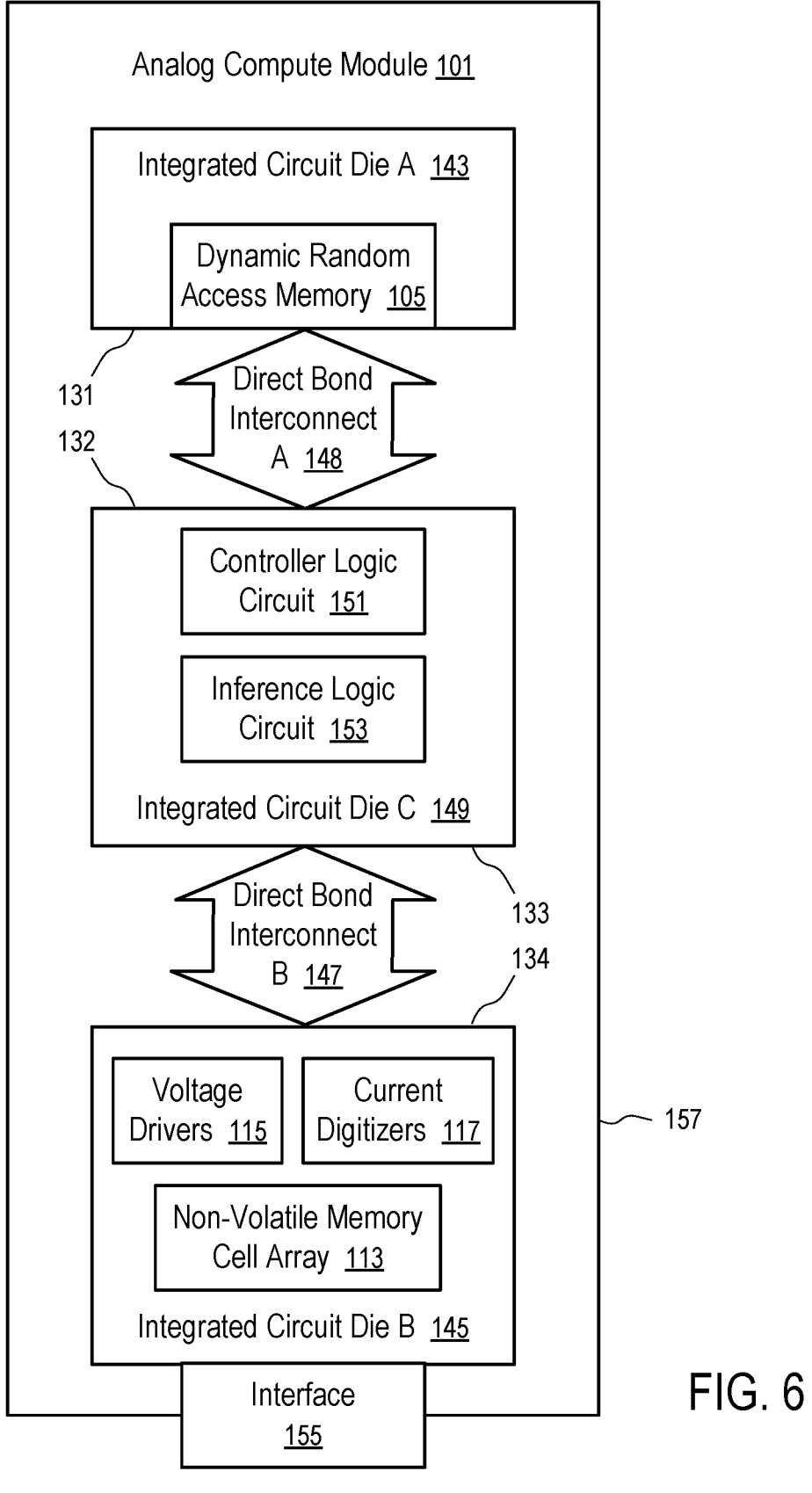

FIG. 5 and FIG. 6 illustrate different configurations of analog compute modules according to some embodiments.

Similar to the analog compute module 101 of FIG. 4, the analog compute modules 101 in FIG. 5 and FIG. 6 can also have an integrated circuit die 149 having logic circuits 151 and 153, an integrated circuit die 143 having a dynamic random access memory 105, and an integrated circuit die 145 having a memory cell array 113.

However, in FIG. 5, the voltage drivers 115 and current digitizers 117 are configured in the integrated circuit die 149 having the inference logic circuit 153. Thus, the integrated circuit die 145 of the memory cell array 113 can be manufactured to contain memory cells and wire connections without added complications of voltage drivers 115 and current digitizers 117.

In FIG. 5, a direct bond interconnect 148 connects the dynamic random access memory 105 to the controller logic circuit 151. Alternatively, microbumps can be used to connect the dynamic random access memory 105 to the controller logic circuit 151.

In FIG. 5, another direct bond interconnect 147 connects the memory cell array 113 to the voltage drivers 115 and the current digitizers 117. Since the direct bond interconnects 147 and 148 are separate from each other, the dynamic random access memory chip may not write data directly into the synapse memory chip without going through the logic circuits in the logic chip. Alternatively, a direct bond interconnect 147 as illustrated in FIG. 4 can be configured to allow the dynamic random access memory chip to write data directly into the synapse memory chip without going through the logic circuits in the logic chip.

Optionally, some of the voltage drivers 115, the current digitizers 117, and the inference logic circuits 153 can be configured in the synapse memory chip, while the remaining portion is configured in the logic chip.

FIG. 4 and FIG. 5 illustrate configurations where the synapse memory chip and the dynamic random access memory chip are placed side-by-side on the logic chip. During manufacturing of the analog compute modules 101, synapse memory chips and dynamic random access memory chips can be placed on a surface of a logic wafer containing the circuits of the logic chips to apply hybrid bonding. The synapse memory chips and dynamic random access memory chips can be combined to the logic wafer at the same time. Subsequently, the logic wafer having the attached synapse memory chips and dynamic random access memory chips can be divided into chips of the analog compute modules (e.g., 101).

Alternatively, as in FIG. 6, the dynamic random access memory chip and the synapse memory chip are placed on different sides of the logic chip.

In FIG. 6, the dynamic random access memory chip is connected to the logic chip via a direct bond interconnect 148 on the top surface 132 of the logic chip. Alternatively, microbumps can be used to connect the dynamic random access memory chip to the logic chip. The synapse memory chip is connected to the logic chip via a direct bond interconnect 147 on the bottom surface 133 of the logic chip. During the manufacturing of the analog compute modules 101, a dynamic random access memory wafer can be attached to, bonded to, or combined with the top surface of the logic wafer in a process/operation; and the memory wafer can be attached to, bonded to, or combined with the bottom side of the logic wafer in another process. The combined wafers can be divided into chips of the analog compute modules 101.

FIG. 6 illustrates a configuration in which the voltage drivers 115 and current digitizers 117 are configured in the synapse memory chip having the memory cell array 113. Alternatively, some of the voltage drivers 115, the current digitizers 117, and the inference logic circuit 153 are configured in the synapse memory chip, while the remaining portion is configured in the logic chip disposed between the dynamic random access memory chip and the synapse memory chip. In other implementations, the voltage drivers 115, the current digitizers 117, and the inference logic circuit 153 are configured in the logic chip, in a way similar to the configuration illustrated in FIG. 5.

In FIG. 4, FIG. 5, and FIG. 6, the interface 155 is positioned at the bottom side of the analog compute module 101, while the dynamic random access memory chip is positioned at the top side of the analog compute module 101.

The voltage drivers 115 in FIG. 4, FIG. 5, and FIG. 6 can be controlled to apply voltages to program the threshold voltages of memory cells in the array 113. Data stored in the memory cells can be represented by the levels of the programmed threshold voltages of the memory cells.

A typical memory cell in the array 113 has a nonlinear current to voltage curve. When the threshold voltage of the memory cell is programmed in a synapse mode to a first level to represent a stored value of one, the memory cell allows a predetermined amount of current to go through when a predetermined read voltage higher than the first level is applied to the memory cell. When the predetermined read voltage is not applied (e.g., the applied voltage is zero), the memory cell allows a negligible amount of current to go through, compared to the predetermined amount of current. On the other hand, when the threshold voltage of the memory cell is programmed in the synapse mode to a second level higher than the predetermined read voltage to represent a stored value of zero, the memory cell allows a negligible amount of current to go through, regardless of whether the predetermined read voltage is applied. Thus, when a bit of weight is stored in the memory as discussed above, and a bit of input is used to control whether to apply the predetermined read voltage, the amount of current going through the memory cell as a multiple of the predetermined amount of current corresponds to the digital result of the stored bit of weight multiplied by the bit of input. Currents representative of the results of 1-bit by 1-bit multiplications can be summed in an analog form before digitized for shifting and summing to perform multiplication and accumulation of multi-bit weights against multi-bit inputs, as further discussed below.

Figure 7:
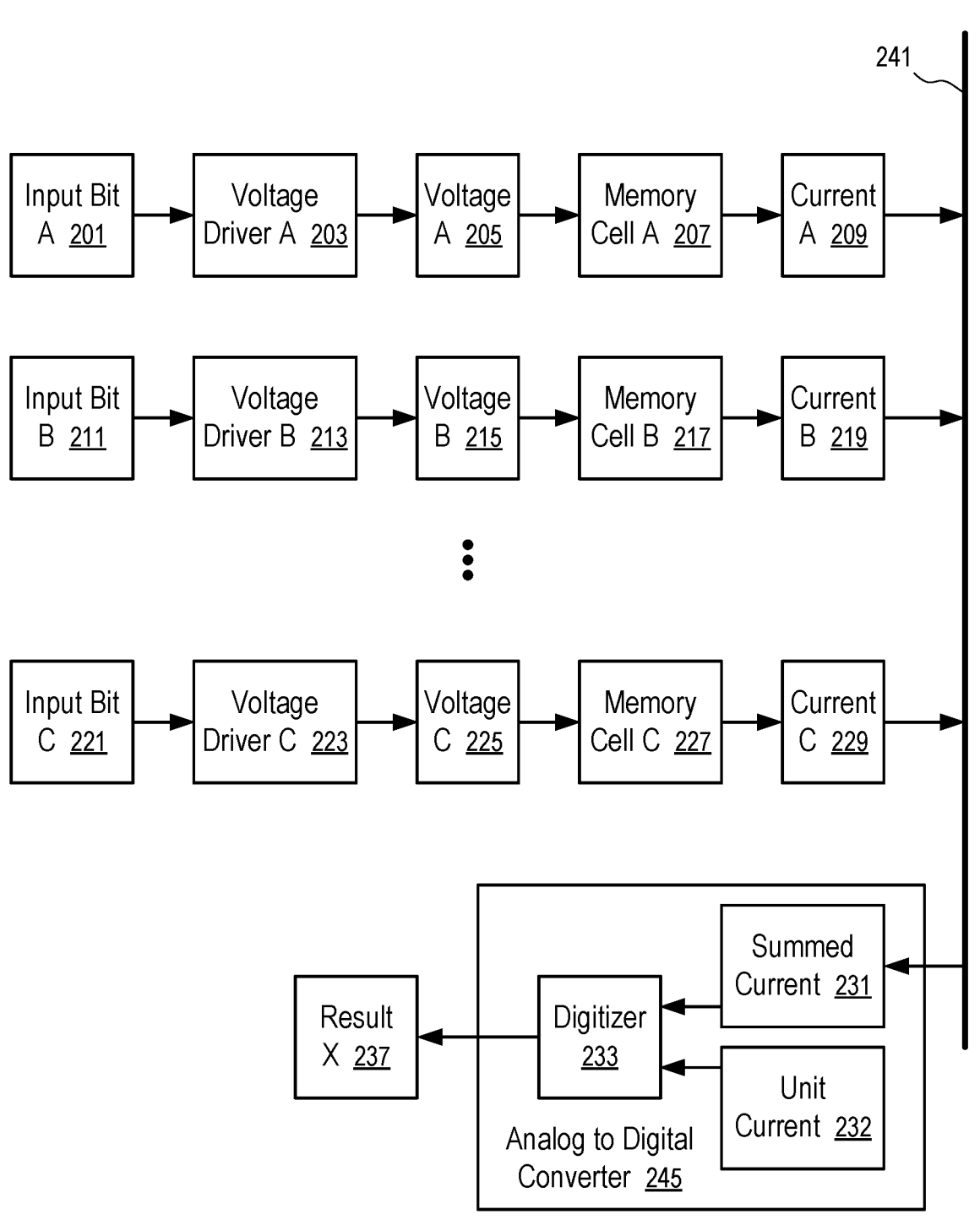
FIG. 7 shows the computation of a column of weight bits multiplied by a column of input bits to provide an accumulation result according to one embodiment.

FIG. 7 shows the computation of a column of weight bits multiplied by a column of input bits to provide an accumulation result according to one embodiment.

In FIG. 7, a column of memory cells 207, 217, . . . , 227 (e.g., in the memory cell array 113 of an analog compute module 101) can be programmed in the synapse mode to have threshold voltages at levels representative of weights stored one bit per memory cell.

The column of memory cells 207, 217, . . . , 227, programmed in the synapse mode, can be read in a synapse mode, during which voltage drivers 203, 213, . . . , 223 (e.g., in the voltage drivers 115 of an analog compute module 101) are configured to apply voltages 205, 215, . . . , 225 concurrently to the memory cells 207, 217, . . . , 227 respectively according to their received input bits 201, 211, . . . , 221.

For example, when the input bit 201 has a value of one, the voltage driver 203 applies the predetermined read voltage as the voltage 205, causing the memory cell 207 to output the predetermined amount of current as its output current 209 if the memory cell 207 has a threshold voltage programmed at a lower level, which is lower than the predetermined read voltage, to represent a stored weight of one, or to output a negligible amount of current as its output current 209 if the memory cell 207 has a threshold voltage programmed at a higher level, which is higher than the predetermined read voltage, to represent a stored weight of zero. However, when the input bit 201 has a value of zero, the voltage driver 203 applies a voltage (e.g., zero) lower than the lower level of threshold voltage as the voltage 205 (e.g., does not apply the predetermined read voltage), causing the memory cell 207 to output a negligible amount of current at its output current 209 regardless of the weight stored in the memory cell 207. Thus, the output current 209 as a multiple of the predetermined amount of current is representative of the result of the weight bit, stored in the memory cell 207, multiplied by the input bit 201.

Similarly, the current 219 going through the memory cell 217 as a multiple of the predetermined amount of current is representative of the result of the weight bit, stored in the memory cell 217, multiplied by the input bit 211; and the current 229 going through the memory cell 227 as a multiple of the predetermined amount of current is representative of the result of the weight bit, stored in the memory cell 227, multiplied by the input bit 221.

The output currents 209, 219, . . . , and 229 of the memory cells 207, 217, . . . , 227 are connected to a common line 241 (e.g., bitline) for summation. The summed current 231 is compared to the unit current 232, which is equal to the predetermined amount of current, by a digitizer 233 of an analog to digital converter 245 to determine the digital result 237 of the column of weight bits, stored in the memory cells 207, 217, . . . , 227 respectively, multiplied by the column of input bits 201, 211, . . . , 221 respectively with the summation of the results of multiplications.

The sum of negligible amounts of currents from memory cells connected to the line 241 is small when compared to the unit current 232 (e.g., the predetermined amount of current). Thus, the presence of the negligible amounts of currents from memory cells does not alter the result 237 and is negligible in the operation of the analog to digital converter 245.

In FIG. 7, the voltages 205, 215, . . . , 225 applied to the memory cells 207, 217, . . . , 227 are representative of digitized input bits 201, 211, . . . , 221; the memory cells 207, 217, . . . , 227 are programmed to store digitized weight bits; and the currents 209, 219, . . . , 229 are representative of digitized results. Thus, the memory cells 207, 217, . . . , 227 do not function as memristors that convert analog voltages to analog currents based on their linear resistances over a voltage range; and the operating principle of the memory cells in computing the multiplication is fundamentally different from the operating principle of a memristor crossbar. When a memristor crossbar is used, conventional digital to analog converters are used to generate an input voltage proportional to inputs to be applied to the rows of memristor crossbar. When the technique of FIG. 7 is used, such digital to analog converters can be eliminated; and the operation of the digitizer 233 to generate the result 237 can be greatly simplified. The result 237 is an integer that is no larger than the count of memory cells 207, 217, . . . , 227 connected to the line 241. The digitized form of the output currents 209, 219, . . . , 229 can increase the accuracy and reliability of the computation implemented using the memory cells 207, 217, . . . , 227.

In general, a weight involving a multiplication and accumulation operation can be more than one bit. Multiple columns of memory cells can be used to store the different significant bits of weights, as illustrated in FIG. 8 to perform multiplication and accumulation operations.

The circuit illustrated in FIG. 7 can be considered a multiplier-accumulator unit configured to operate on a column of 1-bit weights and a column of 1-bit inputs. Multiple such circuits can be connected in parallel to implement a multiplier-accumulator unit to operate on a column of multi-bit weights and a column of 1-bit inputs, as illustrated in FIG. 8.

The circuit illustrated in FIG. 7 can also be used to read the data stored in the memory cells 207, 217, . . . , 227. For example, to read the data or weight stored in the memory cell 207, the input bits 211, . . . , 221 can be set to zero to cause the memory cells 217, . . . , 227 to output negligible amount of currents into the line 241 (e.g., as a bitline). The input bit 201 is set to one to cause the voltage driver 203 to apply the predetermined read voltage. Thus, the result 237 from the digitizer 233 provides the data or weight stored in the memory cell 207. Similarly, the data or weight stored in the memory cell 217 can be read via applying one as the input bit 211 and zeros as the remaining input bits in the column; and data or weight stored in the memory cell 227 can be read via applying one as the input bit 221 and zeros as the other input bits in the column.

In general, the circuit illustrated in FIG. 7 can be used to select any of the memory cells 207, 217, . . . , 227 for read or write. A voltage driver (e.g., 203) can apply a programming voltage pulse to adjust the threshold voltage of a respective memory cell (e.g., 207) to erase data, to store data or weigh, etc.

Figure 8:
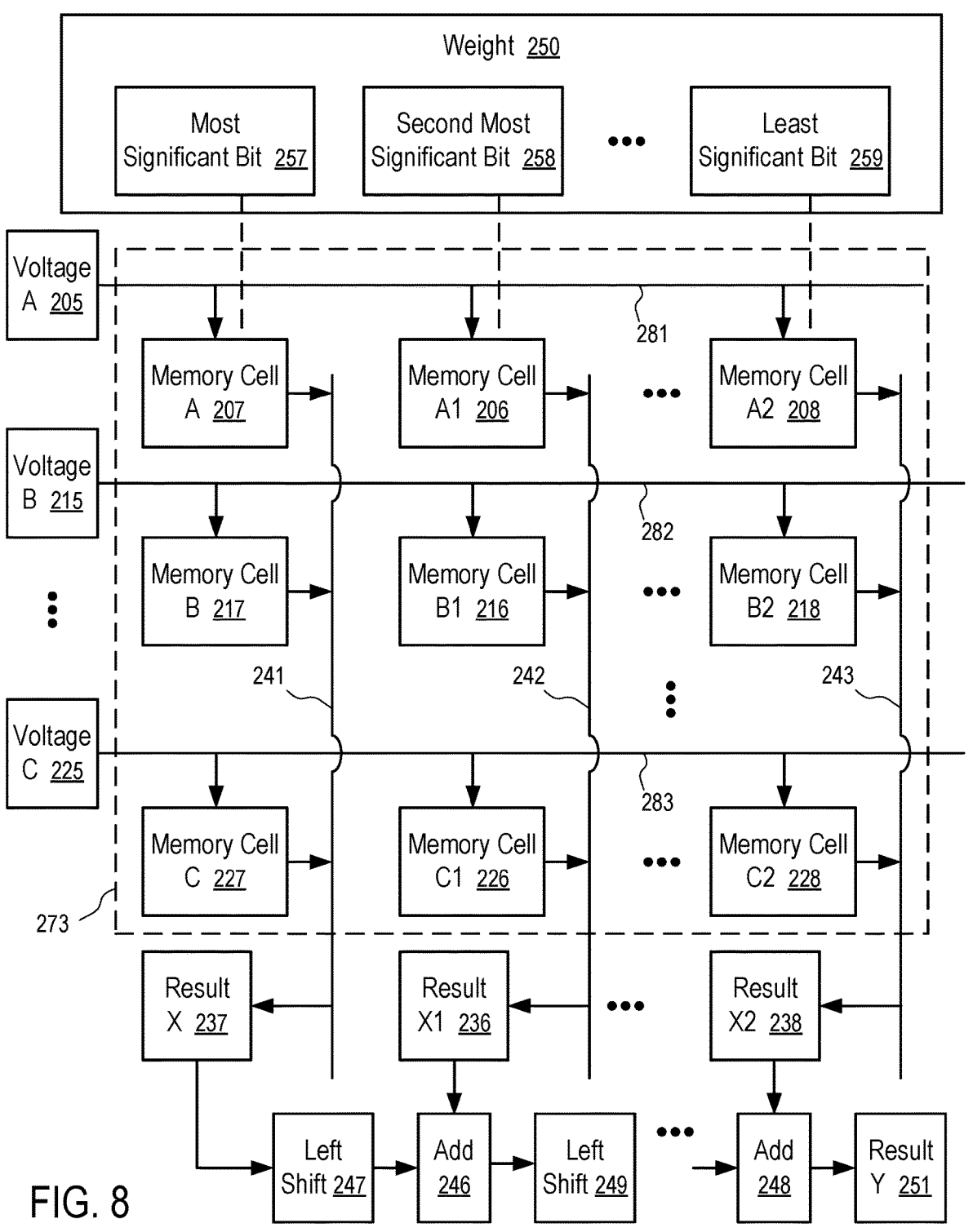
FIG. 8 shows the computation of a column of multi-bit weights multiplied by a column of input bits to provide an accumulation result according to one embodiment.

FIG. 8 shows the computation of a column of multi-bit weights multiplied by a column of input bits to provide an accumulation result according to one embodiment.

In FIG. 8, a weight 250 in a binary form has a most significant bit 257, a second most significant bit 258, . . . , a least significant bit 259. The significant bits 257, 258, . . . , 259 can be stored in a rows of memory cells 207, 206, . . . , 208 (e.g., in the memory cell array 113 of an analog compute module 101) across a number of columns respectively in an array 273. The significant bits 257, 258, . . . , 259 of the weight 250 are to be multiplied by the input bit 201 represented by the voltage 205 applied on a line 281 (e.g., a wordline) by a voltage driver 203 (e.g., as in FIG. 7).

Similarly, memory cells 217, 216, . . . , 218 can be used to store the corresponding significant bits of a next weight to be multiplied by a next input bit 211 represented by the voltage 215 applied on a line 282 (e.g., a wordline) by a voltage driver 213 (e.g., as in FIG. 7); and memory cells 227, 226, . . . , 228 can be used to store corresponding of a weight to be multiplied by the input bit 221 represented by the voltage 225 applied on a line 283 (e.g., a wordline) by a voltage driver 223 (e.g., as in FIG. 7).

The most significant bits (e.g., 257) of the weights (e.g., 250) stored in the respective rows of memory cells in the array 273 are multiplied by the input bits 201, 211, . . . , 221 represented by the voltages 205, 215, . . . , 225 and then summed as the current 231 in a line 241 and digitized using a digitizer 233, as in FIG. 7, to generate a result 237 corresponding to the most significant bits of the weights.

Similarly, the second most significant bits (e.g., 258) of the weights (e.g., 250) stored in the respective rows of memory cells in the array 273 are multiplied by the input bits 201, 211, . . . , 221 represented by the voltages 205, 215, . . . , 225 and then summed as a current in a line 242 and digitized to generate a result 236 corresponding to the second most significant bits.

Similarly, the least significant bits (e.g., 259) of the weights (e.g., 250) stored in the respective rows of memory cells in the array 273 are multiplied by the input bits 201, 211, . . . , 221 represented by the voltages 205, 215, . . . , 225 and then summed as a current in a line 243 and digitized to generate a result 238 corresponding to the least significant bit.

The most significant bit can be left shifted by one bit to have the same weight as the second significant bit, which can be further left shifted by one bit to have the same weight as the next significant bit. Thus, the result 237 generated from multiplication and summation of the most significant bits (e.g., 257) of the weights (e.g., 250) can be applied an operation of left shift 247 by one bit; and the operation of add 246 can be applied to the result of the operation of left shift 247 and the result 236 generated from multiplication and summation of the second most significant bits (e.g., 258) of the weights (e.g., 250). The operations of left shift (e.g., 247, 249) can be used to apply weights of the bits (e.g., 257, 258, . . . ) for summation using the operations of add (e.g., 246, . . . , 248) to generate a result 251. Thus, the result 251 is equal to the column of weights in the array 273 of memory cells multiplied by the column of input bits 201, 211, . . . , 221 with multiplication results accumulated.

In general, an input involving a multiplication and accumulation operation can be more than 1 bit. Columns of input bits can be applied one column at a time to the weights stored in the array 273 of memory cells to obtain the result of a column of weights multiplied by a column of inputs with results accumulated as illustrated in FIG. 9.

The circuit illustrated in FIG. 8 can be used to read the data stored in the array 273 of memory cells. For example, to read the data or weight 250 stored in the memory cells 207, 206, . . . , 208, the input bits 211, . . . , 221 can be set to zero to cause the memory cells 217, 216, . . . , 218, . . . , 227, 226, . . . , 228 to output negligible amount of currents into the line 241, 242, . . . , 243 (e.g., as bitlines). The input bit 201 is set to one to cause the voltage driver 203 to apply the predetermined read voltage as the voltage 205. Thus, the results 237, 236, . . . , 238 from the digitizers (e.g., 233) connected to the lines 241, 242, . . . , 243 provide the bits 257, 258, . . . , 259 of the data or weight 250 stored in the row of memory cells 207, 206, . . . , 208. Further, the result 251 computed from the operations of shift 247, 249, . . . and operations of add 246, . . . , 248 provides the weight 250 in a binary form.

In general, the circuit illustrated in FIG. 8 can be used to select any row of the memory cell array 273 for read. Optionally, different columns of the memory cell array 273 can be driven by different voltage drivers. Thus, the memory cells (e.g., 207, 206, . . . , 208) in a row can be programmed to write data in parallel (e.g., to store the bits 257, 258, . . . , 259) of the weight 250.

Figure 9:
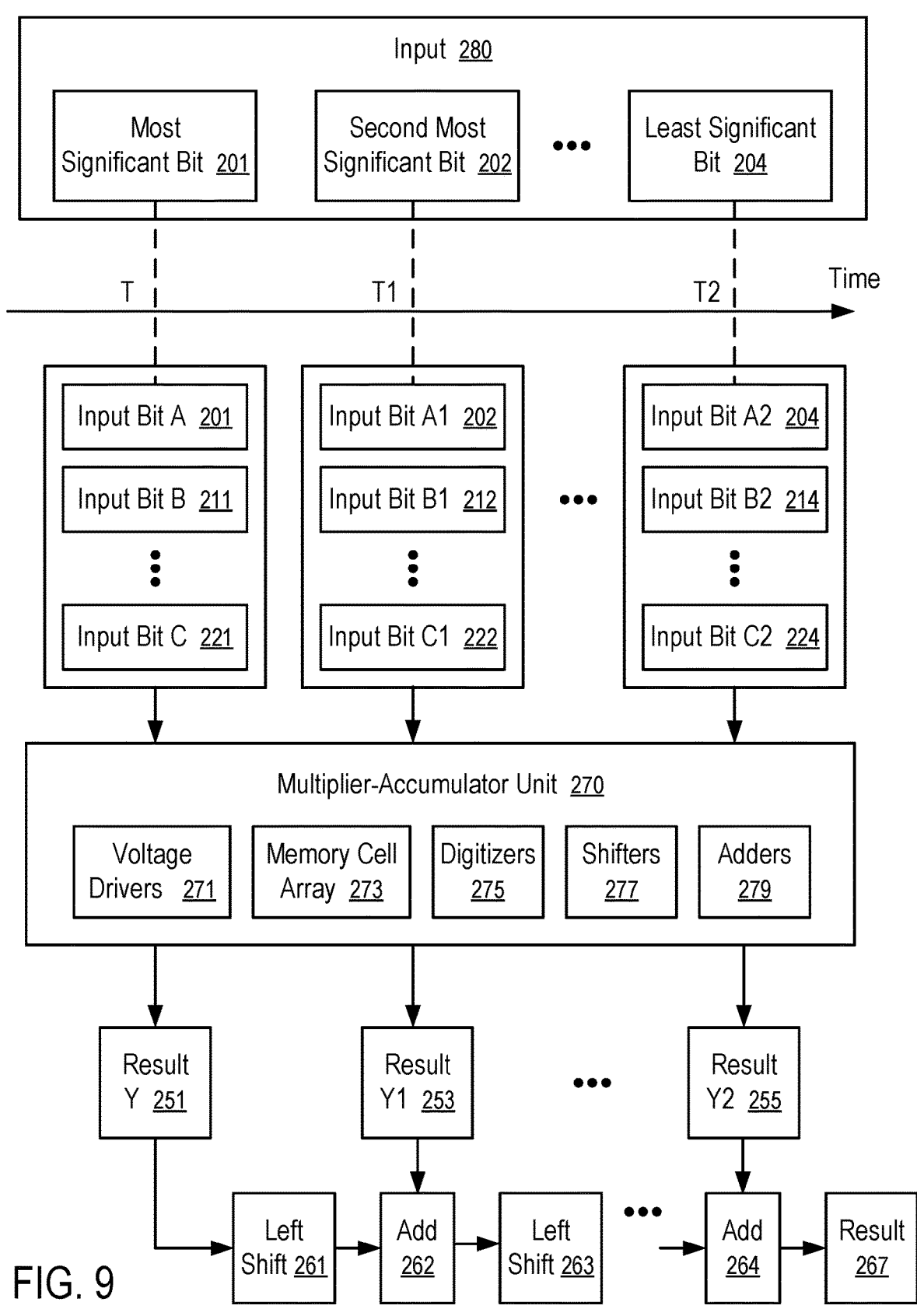
FIG. 9 shows the computation of a column of multi-bit weights multiplied by a column of multi-bit inputs to provide an accumulation result according to one embodiment.

FIG. 9 shows the computation of a column of multi-bit weights multiplied by a column of multi-bit inputs to provide an accumulation result according to one embodiment.

In FIG. 9, the significant bits of inputs (e.g., 280) are applied to a multiplier-accumulator unit 270 at a plurality of time instances T, T1, . . . , T2.

For example, a multi-bit input 280 can have a most significant bit 201, a second most significant bit 202, . . . , a least significant bit 204.

At time T, the most significant bits 201, 211, . . . , 221 of the inputs (e.g., 280) are applied to the multiplier-accumulator unit 270 to obtain a result 251 of weights (e.g., 250), stored in the memory cell array 273, multiplied by the column of bits 201, 211, . . . , 221 with summation of the multiplication results.

For example, the multiplier-accumulator unit 270 can be implemented in a way as illustrated in FIG. 8. The multiplier-accumulator unit 270 has voltage drivers 271 connected to apply voltages 205, 215, . . . , 225 representative of the input bits 201, 211, . . . , 221. The multiplier-accumulator unit 270 has a memory cell array 273 storing bits of weights as in FIG. 8. The multiplier-accumulator unit 270 has digitizers 275 to convert currents summed on lines 241, 242, . . . , 243 for columns of memory cells in the array 273 to output results 237, 236, . . . , 238. The multiplier-accumulator unit 270 has shifters 277 and adders 279 connected to combine the column result 237, 236, . . . , 238 to provide a result 251 as in FIG. 8. In some implementations, the logic circuits of the multiplier-accumulator unit 270 (e.g., shifters 277 and adders 279) are implemented as part of the inference logic circuit 153.

Similarly, at time T1, the second most significant bits 202, 212, . . . , 222 of the inputs (e.g., 280) are applied to the multiplier-accumulator unit 270 to obtain a result 253 of weights (e.g., 250) stored in the memory cell array 273 and multiplied by the vector of bits 202, 212, . . . , 222 with summation of the multiplication results.

Similarly, at time T2, the least significant bits 204, 214, . . . , 224 of the inputs (e.g., 280) are applied to the multiplier-accumulator unit 270 to obtain a result 255 of weights (e.g., 250), stored in the memory cell array 273, multiplied by the vector of bits 202, 212, . . . , 222 with summation of the multiplication results.

The result 251 generated from multiplication and summation of the most significant bits 201, 211, . . . , 221 of the inputs (e.g., 280) can be applied an operation of left shift 261 by one bit; and the operation of add 262 can be applied to the result of the operation of left shift 261 and the result 253 generated from multiplication and summation of the second most significant bits 202, 212, . . . , 222 of the inputs (e.g., 280). The operations of left shift (e.g., 261, 263) can be used to apply weights of the bits (e.g., 201, 202, . . . ) for summation using the operations of add (e.g., 262, . . . , 264) to generate a result 267. Thus, the result 267 is equal to the weights (e.g., 250) in the array 273 of memory cells multiplied by the column of inputs (e.g., 280) respectively and then summed.

A plurality of multiplier-accumulator unit 270 can be connected in parallel to operate on a matrix of weights multiplied by a column of multi-bit inputs over a series of time instances T, T1, . . . , T2.

The multiplier-accumulator units (e.g., 270) illustrated in FIG. 7, FIG. 8, and FIG. 9 can be implemented in analog compute modules 101 in FIG. 1, FIG. 4, FIG. 5, and FIG. 6.

In some implementations, the memory cell array 113 in the analog compute modules 101 in FIG. 1, FIG. 4, FIG. 5, and FIG. 6 has multiple layers of memory cell arrays.

Figure 10:
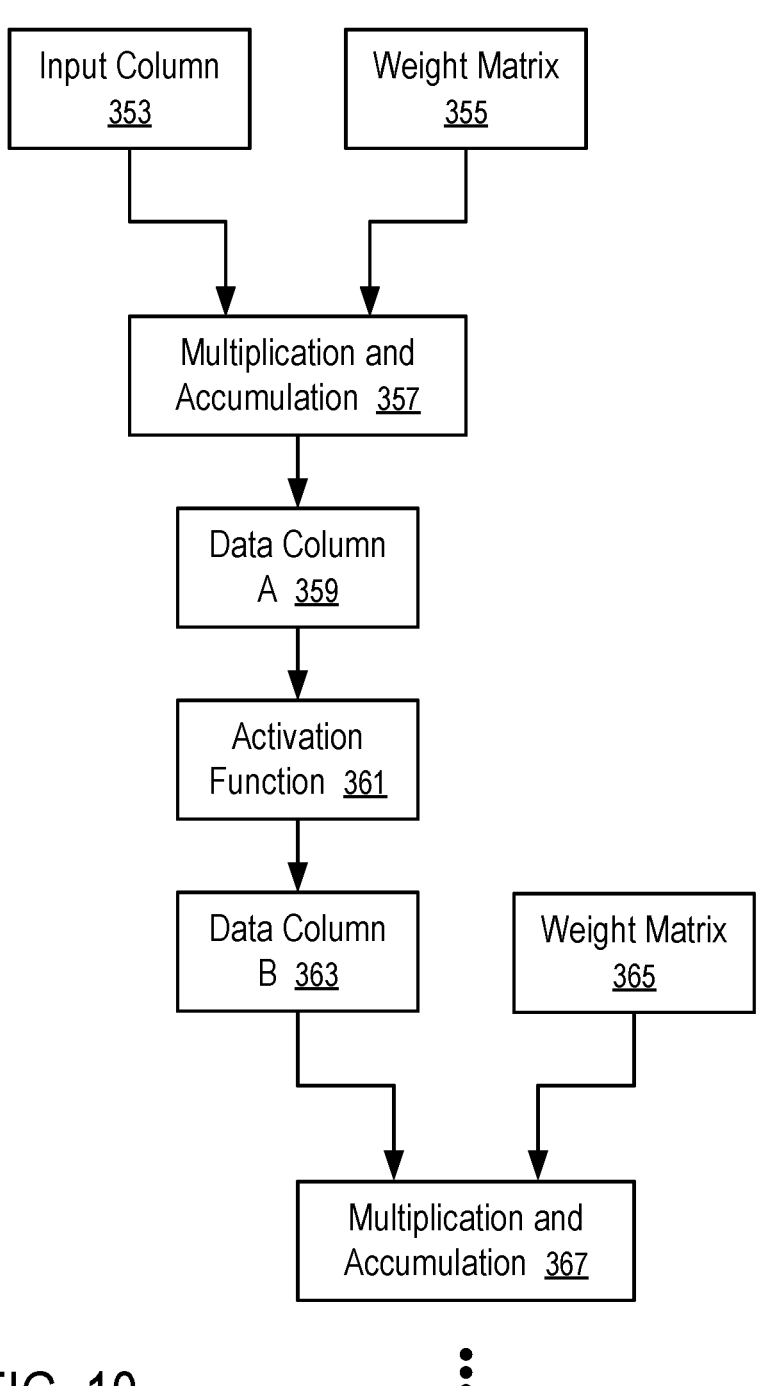
FIG. 10 shows an implementation of artificial neural network computations according to one embodiment.

FIG. 10 shows an implementation of artificial neural network computations according to one embodiment.

For example, the computations of FIG. 10 can be implemented in the analog compute modules 101 of FIG. 1, FIG. 4, FIG. 5, and FIG. 6.

In FIG. 10, a weight matrix 355 is stored in one or more layers of the memory cell array 113 in the synapse memory chip of the analog compute module 101.

A multiplication and accumulation 357 combines an input column 353 and the weight matrix 355 to generate a data column 359. For example, according to instructions stored in the analog compute module 101, the inference logic circuit 153 identifies the storage location of the weight matrix 355 in the synapse memory chip, instructs the voltage drivers 115 to apply, according to the bits of the input column 353, voltages to memory cells storing the weights in the matrix 355 in the synapse mode, and retrieve the multiplication and accumulation results (e.g., 267) from the logic circuits (e.g., adder 264) of the multiplier-accumulator units 270 containing the memory cells.

The multiplication and accumulation results (e.g., 267) provide a column 359 of data representative of combined inputs to a set of input artificial neurons of the artificial neural network. The inference logic circuit 153 can use an activation function 361 to transform the data column 359 to a column 363 of data representative of outputs from the set of input artificial neurons. The outputs from the set of artificial neurons can be provided as inputs to a next set of artificial neurons. A weight matrix 365 includes weights applied to the outputs of the neurons as inputs to the next set of artificial neurons and biases for the neurons. A multiplication and accumulation 367 can be performed in a similar way as the multiplication and accumulation 357. Such operations can be repeated from multiple set of artificial neurons to generate an output of the artificial neural network.

Figure 11:
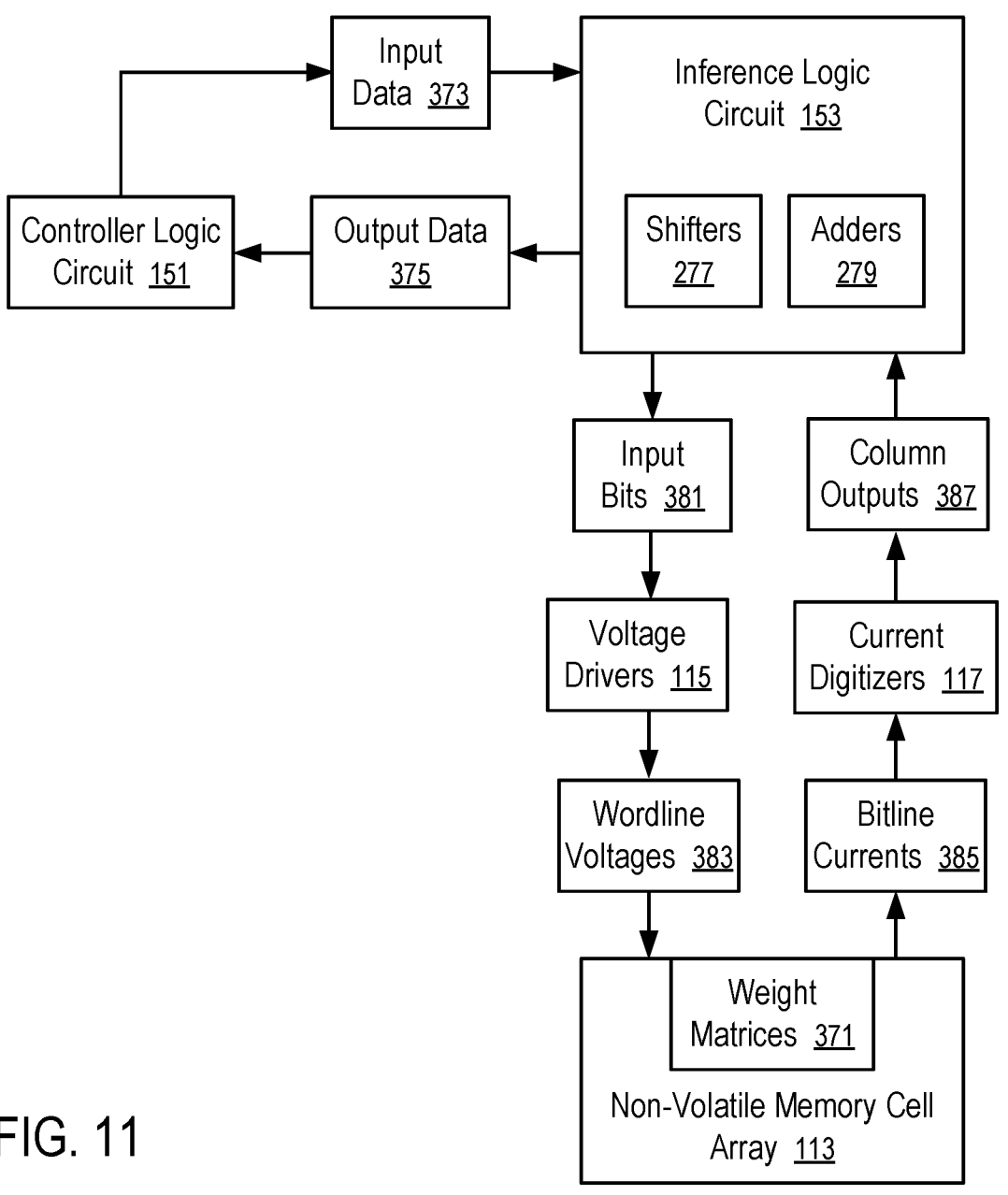
FIG. 11 shows a controller logic circuit using an inference logic circuit in multiplication and accumulation computation according to one embodiment.

FIG. 11 shows a controller logic circuit using an inference logic circuit in multiplication and accumulation computation according to one embodiment. For example, the technique of FIG. 11 can be implemented in analog compute modules 101 of FIG. 1, FIG. 4, FIG. 5, and FIG. 6.

In FIG. 11, a controller logic circuit 151 in a logic chip (e.g., integrated circuit die 149) in an analog compute module 101 is configured to provide a service of multiplication and accumulation (e.g., to a processor 111 outside of the analog compute module 101).

In response to receiving input data 373 written into an address region associated with the weight matrices 371, the controller logic circuit 151 can request the inference logic circuit 153 to apply the input data 373 to the weight matrices 371 to generate output data 375 resulting from multiplication and accumulation. The controller logic circuit 151 can store the output data 375 in an address region configured to be read by the processor 111 outside of the analog compute module 101 to the retrieval of the output data 375.

In some implementations, the input data 373 can include an identification of the location of a matrix 371 stored in the synapse mode in the memory cell array 113 and a column of inputs (e.g., 280). In response, the inference logic circuit 153 uses a column of input bits 381 to control voltage drivers 115 to apply wordline voltages 383 onto rows of memory cells storing the weights of a matrix 371 identified by the input data 373. The voltage drivers 115 apply voltages of predetermined magnitudes on wordlines to represent the input bits 381. The memory cells in the memory cell array 113 are configured to output currents that are negligible or multiples of a predetermined amount of current 232. Thus, the combination of the voltage drivers 115 and the memory cells storing the weight matrices 371 functions as digital to analog converters configured to convert the results of bits of weights (e.g., 250) multiplied by the bits of inputs (e.g., 280) into output currents (e.g., 209, 219, . . . , 229). Bitlines (e.g., lines 241, 242, . . . , 243) in the memory cell array 113 sum the currents in an analog form. The summed currents (e.g., 231) in the bitlines (e.g., line 241) are digitized as column outputs 387 by the current digitizers 117 for further processing in a digital form (e.g., using shifters 277 and adders 279 in the inference logic circuit 153) to obtain the output data 375.

As illustrated in FIG. 7 and FIG. 8, the wordline voltages 383 (e.g., 205, 215, . . . , 225) are representative of the applied input bits 381 (e.g., 201, 211, . . . , 221) and cause the memory cells in the array 113 to generate output currents (e.g., 209, 21, . . . , 229). The memory cell array 113 connects output currents from each column of memory cells to a respective line (e.g., 241, 242, . . . , or 243) to sum the output currents for a respective column. Current digitizers 117 can determine the bitline currents 385 in the lines (e.g., bitlines) in the array 113 as multiples of a predetermined amount of current 232 to provide the summation results (e.g., 237, 236, . . . , 238) as the column outputs 387. Shifters 277 and adders 279 of the inference logic circuit 153 (or in the synapse memory chip) can be used to combine the column outputs 387 with corresponding weights for different significant bits of weights (e.g., 250) as in FIG. 8 and with corresponding weights (e.g., 250) for the different significant bits of the inputs (e.g., 280) as in FIG. 9 to generate results of multiplication and accumulation.

The inference logic circuit 153 can provide the results of multiplication and accumulation as the output data 375. In response, the controller logic circuit 151 can provide further input data 373 to obtain further output data 375 by combining the input data 373 with a weight matrix 371 in the memory cell array 113 through operations of multiplication and accumulation.

The memory cell array 113 stores the weight matrices 371 of an artificial neural network, such as attack detection weight matrices 163, ADAS weight matrices 165, etc. The controller logic circuit 151 can be configured (e.g., via instructions) to apply inputs to one set of artificial neurons at a time, as in FIG. 10, to perform the computations of the artificial neural network. Thus, the computation of the artificial neural network can be performed within the analog compute module 101 (e.g., to implement an attack model evaluator 137, an ADAS model evaluator 139) without assistance from the processor 111 outside of the analog compute module 101.

Alternatively, the analog compute module 101 is configured to perform the operations of multiplication and accumulation (e.g., 357, 367) in response to the processor 111 writing the inputs (e.g., columns 353, 363) into the analog compute module 101; and the processor 111 can be configured to retrieve the results of the multiplication and accumulation (e.g., data column 359) and apply the computations of activation function 361 and other computations of the artificial neural network.

Thus, the controller logic circuit 151 can be configured to function as an accelerator of multiplication and accumulation, or a co-processor of artificial neural networks, or both.

FIG. 12 shows a method of attack detection according to one embodiment. For example, the method of FIG. 12 can be performed in an analog compute module 101 of FIG. 1, FIG. 4, FIG. 5, and FIG. 6 using an attack detector 109 of FIG. 2 and FIG. 3 implemented using the multiplication and accumulation techniques of FIG. 7, FIG. 8, and FIG. 9, and optionally the artificial neural network computations illustrated in FIG. 11.

At block 401, a device (e.g., analog compute module 101) programs a non-volatile memory cell array of the device (e.g., a portion of the array 113 in the analog compute module 101) in a first mode (e.g., synapse mode) to store weight matrices (e.g., 163) of an artificial neural network.

For example, the artificial neural network is trained to classify a sequence of commands, received as an input the artificial neural network, as a type of known attacks, a type of normal operations, or a type of anomalous operations of an unknown type. The artificial neural network can include at least a recurrent neural network (RNN), a long short term memory (LSTM) network, or an attention-based neural network, or any combination thereof.

For example, the analog compute module 101 can be used to provide memory services and optionally, multiplication and accumulation services to a processor 111 of an advanced driver-assistance system (ADAS) illustrated in FIG. 1. The processor 111 is connected to sensors 102 (e.g., digital cameras, radars, lidars, sonars) configured on a vehicle to provide, based on inputs from the sensors 102, advanced driver-assistance via the infotainment system 106 of the vehicle, and optionally via the vehicle controls 108 (e.g., acceleration control, braking control, steering control). A memory channel 112 is connected between the processor 111 and the analog compute module 101; and the processor 111 can send commands through the memory channel 112 to the analog compute module 101. In some implementations, other components (e.g., sensors 102, infotainment system 106) of the vehicle can also access the analog compute module 101 via the memory channel 112.

The analog compute module 101 can include an interface 155 operable on the memory channel 112 to provide services offered via its dynamic random access memory 105 and a non-volatile memory cell array 113. For example, write commands can be used to write weight matrices (e.g., 163, 165) in a region of addresses to cause the controller 107 to program, in the synapse mode, a portion of the non-volatile memory cell array 113 identified by the region of addresses to store weight matrices (e.g., 163, 165).

Each respective memory cell in the non-volatile memory cell array 113 can be programmed in the synapse mode to output: a predetermined amount of current 232 in response to a predetermined read voltage when the respective memory cell has a threshold voltage programmed to represent a value of one, or a negligible amount of current in response to the predetermined read voltage when the threshold voltage is programmed to represent a value of zero. The respective memory cell can be programmed in a second mode (e.g., storage mode) to have a threshold voltage positioned in one of a plurality of voltage regions, each representative of one of a plurality of predetermined values. A memory cell programmed the synapse mode can be used to multiplication and accumulation operations as in FIG. 7. A memory cell programmed in the storage mode is generally not usable in the multiplication and accumulation operations as in FIG. 7.

For example, the analog compute module 101 can include: a first integrated circuit die 143 containing the random access memory including a dynamic random access memory 105; a second integrated circuit die 145 containing the non-volatile memory cell array 113; and a third integrated circuit die 149 containing the controller 107. Optionally, an integrated circuit package 157 is configured to enclose at least the first integrated circuit die 143, the second integrated circuit die 145, and the third integrated circuit die 149. The circuits in the first integrated circuit die 143, the second integrated circuit die 145, and the third integrated circuit die 149 can be interconnected via hybrid bonding.

For example, the analog compute module 101 can include voltage drivers 115 and current digitizers 117. The non-volatile memory cell array 113 has wordlines (e.g., 281, 282, . . . , 283) and bitlines (e.g., 241, 242, . . . , 243). To perform a multiplication and accumulation operation (e.g., as in FIG. 7, FIG. 8, and FIG. 9), the controller 107 is configured to instruct the voltage drivers (e.g., 203, 213, . . . , 223) to apply voltages (e.g., 205, 215, . . . , 225) to the wordlines (e.g., 281, 282, . . . , 283) according to input bits (e.g., 201, 211, . . . , 221) to cause output currents (e.g., 209, 219, . . . , 229) through memory cells (e.g., 207, 217, . . . , 227), programmed in the synapse mode to store a weight matrix, to be summed in the bitlines (e.g., 241) in an analog form. The current digitizers (e.g., 233) are configured to convert currents in the bitlines (e.g., 241) as multiple of the predetermined amount of current 232, where the output results (e.g., 237) of the current digitizer (e.g., 233) are representative of digital results of multiplication and accumulation applied to the input bits and the weight matrix.

To perform the multiplication and accumulation operation (e.g., as in FIG. 7, FIG. 8, and FIG. 9), the controller 107 is configured to a voltage driver (e.g., 203) to apply, to a respective wordline (e.g., 281): the predetermined read voltage, when an input bit (e.g., 201) provided for the respective wordline (e.g., 281) is one; or a voltage lower than the predetermined read voltage to cause memory cells (e.g., 207, 206, . . . , 208) on the respective wordline (e.g., 281) to output negligible amount of currents to the bitlines (e.g., 241, 242, . . . , 243), when the input bit (e.g., 201) provided for the respective wordline (e.g., 281) is zero.

At block 403, an interface 155 of the device (e.g., analog compute module 101) operable on a memory channel 112 receives commands to access memory services provided via at least a random access memory of the device during operations of an advanced driver-assistance system.

Optionally, the device (e.g., analog compute module 101) includes a buffer 103 (e.g., a first-in first-out (FIFO) buffer) configured to buffer commands received via the interface 155 for execution in the device. The controller 107 can have a controller logic circuit 151 configured to fetch the commands from the buffer and execute the commands (e.g., by writing data into the dynamic random access memory 105, or the non-volatile memory cell array 113, retrieving data, generating a response to the commands).

Alternatively, the commands received via the interface 155 are configured to operate on the dynamic random access memory 105 directly; and the controller 107 is configured to further determine whether to perform further operations based on the regions of addresses used in the commands.

For example, writing data in an address region in the dynamic random access memory 105 can cause the controller 107 to program the data in the synapse mode in a corresponding portion in the non-volatile memory cell array 113.

For example, writing data in another address region in the dynamic random access memory 105 can cause the controller 107 to apply the data as input to a corresponding weight matrix in the non-volatile memory cell array 113 to generate a result of multiplication and accumulation, and store the result in the dynamic random access memory 105 for retrieval through the interface 155.

For example, writing data in a further address region in the dynamic random access memory 105 can cause the controller 107 to apply the data as input to an artificial neural network having corresponding weight matrices in the non-volatile memory cell array 113 to generate an output of the artificial neural network, and store the output in the dynamic random access memory 105 for retrieval through the interface 155.

At block 405, the controller 107 detects a trigger event.

For example, the trigger event can be based on an operating parameter of the device. The operating parameter can be based on a rate of utilization of the memory channel 112, a rate of activation commands addressed to a region of memory addresses, or a rate of commands of a predetermined type addressed to a region of memory addresses.

At block 407, the controller 107 identifies, in response to the trigger event, a sequence 121 of commands received in the interface 155 from the memory channel 112.

At block 409, the controller 107 performs operations of multiplication and accumulation using the non-volatile memory cell array 113 to implement computations of the artificial neural network responsive to the sequence 121 of commands as an input to the artificial neural network to generate a classification 124 of the sequence 121 as an output from the artificial neural network.

In some implementations, an application running in the processor 111 uses the services of the multiplication and accumulation of the analog compute module 101 to perform the computations of the artificial neural network trained to generate the classification 124. In other implementations, the analog compute module 101 can perform the entire computations of the artificial neural network to generate the classification 124 without assistance from the processor 111.

At block 411, the device (e.g., analog compute module 101) provides the classification 124 via the interface 155.

For example, the controller 107 can store data representative of the classification 124 in the dynamic random access memory 105 at a predetermined address for retrieval by the processor 111 of the advanced driver-assistance system (ADAS). The processor 111 can read the address periodically, or in response to an interrupt signal from the analog compute module 101. In response to the classification 124 is a type of known attacks, or a type of anomalous operations of an unknown type, the processor 111 can generate a warning or an alert in the infotainment system 106, change a pattern of accessing the analog compute module 101 (e.g., with an increased memory refreshing rate and a reduced rate of commands to the analog compute module 101), and optionally generate control signals for the vehicle controls 108 (e.g., to reduce the speed of the vehicle, stop the vehicle safely).

Analog compute modules 101 (e.g., as in FIG. 1, FIG. 4, FIG. 5, and FIG. 6) can be configured as a storage device, a memory module, or a hybrid of a storage device and memory module. Examples of a storage device include a solid-state drive (SSD), a flash drive, a universal serial bus (USB) flash drive, an embedded multi-media controller (eMMC) drive, a universal flash storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The analog compute modules 101 (e.g., as in FIG. 1, FIG. 4, FIG. 5, and FIG. 6) can be installed in a computing system as a memory sub-system having an inference computation capability. Such a computing system can be a computing device such as a desktop computer, a laptop computer, a network server, a mobile device, a portion of a vehicle (e.g., airplane, drone, train, automobile, or other conveyance), an internet of things (IoT) enabled device, an embedded computer (e.g., one included in a vehicle, industrial equipment, or a networked commercial device), or such a computing device that includes memory and a processing device.

In general, a computing system can include a host system that is coupled to one or more memory sub-systems (e.g., analog compute module 101 of FIG. 1, FIG. 4, FIG. 5, and FIG. 6). In one example, a host system is coupled to one memory sub-system. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

For example, the host system can include a processor chipset (e.g., processing device) and a software stack executed by the processor chipset. The processor chipset can include one or more cores, one or more caches, a memory controller (e.g., NVDIMM controller), and a storage protocol controller (e.g., PCIe controller, SATA controller). The host system uses the memory sub-system, for example, to write data to the memory sub-system and read data from the memory sub-system.

The host system can be coupled to the memory sub-system via a physical host interface. Examples of a physical host interface include, but are not limited to, a serial advanced technology attachment (SATA) interface, a peripheral component interconnect express (PCIe) interface, a universal serial bus (USB) interface, a fibre channel, a serial attached SCSI (SAS) interface, a double data rate (DDR) memory bus interface, a small computer system interface (SCSI), a dual in-line memory module (DIMM) interface (e.g., DIMM socket interface that supports double data rate (DDR)), an open NAND flash interface (ONFI), a double data rate (DDR) interface, a low power double data rate (LPDDR) interface, a compute express link (CXL) interface, or any other interface. The physical host interface can be used to transmit data between the host system and the memory sub-system. The host system can further utilize an NVM express (NVMe) interface to access components (e.g., memory devices) when the memory sub-system is coupled with the host system by the PCIe interface. The physical host interface can provide an interface for passing control, address, data, and other signals between the memory sub-system and the host system. In general, the host system can access multiple memory sub-systems via a same communication connection, multiple separate communication connections, or a combination of communication connections.

The processing device of the host system can be, for example, a microprocessor, a central processing unit (CPU), a processing core of a processor, an execution unit, etc. In some instances, the controller can be referred to as a memory controller, a memory management unit, or an initiator. In one example, the controller controls the communications over a bus coupled between the host system and the memory sub-system. In general, the controller can send commands or requests to the memory sub-system for desired access to memory devices. The controller can further include interface circuitry to communicate with the memory sub-system. The interface circuitry can convert responses received from the memory sub-system into information for the host system.

The controller of the host system can communicate with the controller of the memory sub-system to perform operations such as reading data, writing data, or erasing data at the memory devices, and other such operations. In some instances, the controller is integrated within the same package of the processing device. In other instances, the controller is separate from the package of the processing device. The controller or the processing device can include hardware such as one or more integrated circuits (ICs), discrete components, a buffer memory, or a cache memory, or a combination thereof. The controller or the processing device can be a microcontroller, special-purpose logic circuitry (e.g., a field programmable gate array (FPGA), an application specific integrated circuit (ASIC), etc.), or another suitable processor.

The memory devices can include any combination of the different types of non-volatile memory components and volatile memory components. The volatile memory devices can be, but are not limited to, random access memory (RAM), such as dynamic random access memory (DRAM) and synchronous dynamic random access memory (SDRAM).

Some examples of non-volatile memory components include a negative-and (or, NOT AND) (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices can include one or more arrays of memory cells. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some embodiments, each of the memory devices can include one or more arrays of memory cells such as SLCs, MLCs, TLCs, QLCs, PLCs, or any combination of such. In some embodiments, a particular memory device can include an SLC portion, an MLC portion, a TLC portion, a QLC portion, or a PLC portion of memory cells, or any combination thereof. The memory cells of the memory devices can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), spin transfer torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller (or controller for simplicity) can communicate with the memory devices to perform operations such as reading data, writing data, or erasing data at the memory devices and other such operations (e.g., in response to commands scheduled on a command bus by controller). The controller can include hardware such as one or more integrated circuits (ICs), discrete components, or a buffer memory, or a combination thereof. The hardware can include digital circuitry with dedicated (i.e., hard-coded) logic to perform the operations described herein. The controller can be a microcontroller, special-purpose logic circuitry (e.g., a field programmable gate array (FPGA), an application specific integrated circuit (ASIC), etc.), or another suitable processor.

The controller can include a processing device (processor) configured to execute instructions stored in a local memory. In the illustrated example, the local memory of the controller includes an embedded memory configured to store instructions for performing various processes, operations, logic flows, and routines that control operation of the memory sub-system, including handling communications between the memory sub-system and the host system.

In some embodiments, the local memory can include memory registers storing memory pointers, fetched data, etc. The local memory can also include read-only memory (ROM) for storing micro-code. While the example memory sub-system includes a controller, in another embodiment of the present disclosure, a memory sub-system does not include a controller, and can instead rely upon external control (e.g., provided by an external host, or by a processor or controller separate from the memory sub-system).

In general, the controller can receive commands or operations from the host system and can convert the commands or operations into instructions or appropriate commands to achieve the desired access to the memory devices. The controller can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices. The controller can further include host interface circuitry to communicate with the host system via the physical host interface. The host interface circuitry can convert the commands received from the host system into command instructions to access the memory devices as well as convert responses associated with the memory devices into information for the host system.

The memory sub-system can also include additional circuitry or components that are not illustrated. In some embodiments, the memory sub-system can include a cache or buffer (e.g., DRAM) and address circuitry (e.g., a row decoder and a column decoder) that can receive an address from the controller and decode the address to access the memory devices.

In some embodiments, the memory devices include local media controllers that operate in conjunction with the memory sub-system controller to execute operations on one or more memory cells of the memory devices. An external controller (e.g., memory sub-system controller) can externally manage the memory device (e.g., perform media management operations on the memory device). In some embodiments, a memory device is a managed memory device, which is a raw memory device combined with a local media controller for media management within the same memory device package. An example of a managed memory device is a managed NAND (MNAND) device.

The controller or a memory device can include a storage manager configured to implement storage functions discussed above. In some embodiments, the controller in the memory sub-system includes at least a portion of the storage manager. In other embodiments, or in combination, the controller or the processing device in the host system includes at least a portion of the storage manager. For example, the controller, the controller, or the processing device can include logic circuitry implementing the storage manager. For example, the controller, or the processing device (processor) of the host system, can be configured to execute instructions stored in memory for performing the operations of the storage manager described herein. In some embodiments, the storage manager is implemented in an integrated circuit chip disposed in the memory sub-system. In other embodiments, the storage manager can be part of firmware of the memory sub-system, an operating system of the host system, a device driver, or an application, or any combination therein.

In one embodiment, an example machine of a computer system within which a set of instructions, for causing the machine to perform any one or more of the methods discussed herein, can be executed. In some embodiments, the computer system can correspond to a host system that includes, is coupled to, or utilizes a memory sub-system or can be used to perform the operations described above. In alternative embodiments, the machine can be connected (e.g., networked) to other machines in a LAN, an intranet, an extranet, or the internet, or any combination thereof. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a personal digital assistant (PDA), a cellular telephone, a web appliance, a server, a network router, a switch or bridge, a network-attached storage facility, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system includes a processing device, a main memory (e.g., read-only memory (ROM), flash memory, dynamic random access memory (DRAM) such as synchronous DRAM (SDRAM) or Rambus DRAM (RDRAM), static random access memory (SRAM), etc.), and a data storage system, which communicate with each other via a bus (which can include multiple buses).

Processing device represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device can also be one or more special-purpose processing devices such as an application specific integrated circuit (ASIC), a field programmable gate array (FPGA), a digital signal processor (DSP), network processor, or the like. The processing device is configured to execute instructions for performing the operations and steps discussed herein. The computer system can further include a network interface device to communicate over the network.

The data storage system can include a machine-readable medium (also known as a computer-readable medium) on which is stored one or more sets of instructions or software embodying any one or more of the methodologies or functions described herein. The instructions can also reside, completely or at least partially, within the main memory and within the processing device during execution thereof by the computer system, the main memory and the processing device also constituting machine-readable storage media. The machine-readable medium, data storage system, or main memory can correspond to the memory sub-system.

In one embodiment, the instructions include instructions to implement functionality corresponding to the operations described above. While the machine-readable medium is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special-purpose circuitry, with or without software instructions, such as using application-specific integrated circuit (ASIC) or field-programmable gate array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A device, comprising:
an interface operable on a memory channel;
a random access memory;
a non-volatile memory cell array; and
a controller configured to detect a trigger event, and in response:
    identify a sequence of commands received in the interface from the memory channel to access memory services provided via at least the random access memory;
    generate a classification of the sequence of commands from computations of an artificial neural network, wherein the artificial neural network is responsive to the sequence of commands as an input to generate the classification of the sequence as an output of the artificial neural network, and wherein the computations of the artificial neural network include one or more operations of multiplication and accumulation performed using the non-volatile memory cell array; and
    provide, via the interface, the classification that is generated by the artificial neural network in response to receiving the sequence of commands.

2. The device of claim 1, wherein the trigger event is based on an operating parameter of the device.

3. The device of claim 2, wherein the operating parameter is based on a rate of utilization of the memory channel, a rate of activation commands addressed to a region of memory addresses, or a rate of commands of a predetermined type addressed to a region of memory addresses.

4. The device of claim 3, further comprising:

a buffer configured to buffer commands received via the interface for execution in the device.

5. The device of claim 3, further comprising:

a first integrated circuit die containing the random access memory including a dynamic random access memory;

a second integrated circuit die containing the non-volatile memory cell array; and a third integrated circuit die containing the controller.

6. The device of claim 5, further comprising:

an integrated circuit package configured to enclose the first integrated circuit die, the second integrated circuit die, and the third integrated circuit die.

7. The device of claim 5, wherein the artificial neural network is trained to classify the sequence of commands as a type of known attacks, a type of normal operations, or a type of anomalous operations of an unknown type; and the artificial neural network includes at least a recurrent neural network (RNN), a long short term memory (LSTM) network, or an attention-based neural network.

8. The device of claim 5, wherein a portion of the non-volatile memory cell array is programmed in a mode to store weight matrices of the artificial neural network; and the mode is configured to facilitate operations of multiplication and accumulation.

9. The device of claim 8, wherein the controller is configured to perform computations of the artificial neural network without assistance from outside of the device.

10. The device of claim 8, wherein each respective memory cell programmed in the mode in the non-volatile memory cell array is configured to output:

a predetermined amount of current in response to a predetermined read voltage when the respective memory cell has a threshold voltage programmed to represent a value of one; or a negligible amount of current in response to the predetermined read voltage when the threshold voltage is programmed to represent a value of zero;

wherein each respective memory cell is programmable in an alternative mode in the non-volatile memory cell array to have a threshold voltage positioned in one of a plurality of voltage regions, each representative of one of a plurality of predetermined values.

11. The device of claim 10, further comprising:

voltage drivers; and current digitizers;

wherein the non-volatile memory cell array includes wordlines and bitlines;

wherein the controller is configured to instruct the voltage drivers to apply voltages to the wordlines according to input bits to cause output currents through memory cells, programmed in the mode to store a weight matrix, to be summed in the bitlines in an analog form; and wherein the current digitizers are configured to convert currents in the bitlines as multiple of the predetermined amount of current, representative of digital results of multiplication and accumulation applied to the input bits and the weight matrix.

12. The device of claim 11, wherein the controller is configured to cause a voltage driver to apply, to a respective wordline:

the predetermined read voltage, when an input bit provided for the respective wordline is one; or a voltage lower than the predetermined read voltage to cause memory cells on the respective wordline to output negligible amount of currents to the bitlines, when the input bit provided for the respective wordline is zero.

13. A method, comprising:

receiving, in an interface of a device operable on a memory channel, commands to access memory services provided via at least a random access memory of the device;

programming a non-volatile memory cell array of the device in a first mode to store weight matrices of an artificial neural network;

detecting a trigger event; and in response to the trigger event:

identifying a sequence of commands received in the interface from the memory channel;

generating a classification of the sequence of commands from performing computations of the artificial neural network, wherein the artificial neural network is responsive to the sequence of commands as an input to generate the classification of the sequence as an output of the artificial neural network, and wherein the computations of the artificial neural network include one or more operations of multiplication and accumulation performed using the non-volatile memory cell array; and providing, via the interface, the classification that is generated by the artificial neural network in response to receiving the sequence of commands.

14. The method of claim 13, wherein the trigger event is based on an operating parameter of the device; and the operating parameter is based on a rate of utilization of the memory channel, a rate of activation commands addressed to a region of memory addresses, or a rate of commands of a predetermined type addressed to a region of memory addresses.

15. The method of claim 14, wherein the artificial neural network is trained to classify the sequence of commands as a type of known attacks, a type of normal operations, or a type of anomalous operations of an unknown type; and the artificial neural network includes at least a recurrent neural network (RNN), a long short term memory (LSTM) network, or an attention-based neural network.

16. The method of claim 15, wherein each respective memory cell programmed in the first mode in the non-volatile memory cell array is configured to output:

a predetermined amount of current in response to a predetermined read voltage when the respective memory cell has a threshold voltage programmed to represent a value of one; or a negligible amount of current in response to the predetermined read voltage when the threshold voltage is programmed to represent a value of zero.

17. The method of claim 16, wherein the non-volatile memory cell array includes wordlines and bitlines; and the method further comprises:

instructing voltage drivers of the device to apply voltages to the wordlines according to input bits to cause output currents through memory cells, programmed in the first mode to store a weight matrix, to be summed in the bitlines in an analog form, wherein a voltage driver is configured to apply, to a respective wordline:

the predetermined read voltage, when an input bit provided for the respective wordline is one; or a voltage lower than the predetermined read voltage to cause memory cells on the respective wordline to output negligible amount of currents to the bitlines, when the input bit provided for the respective word-line is zero; and converting, using current digitizers of the device, currents in the bitlines as multiple of the predetermined amount of current, representative of digital results of multiplication and accumulation applied to the input bits and the weight matrix.

18. A computing system, comprising:

an infotainment system;

at least one sensor adapted to be installed on a vehicle;

a processor configured to perform computations of advanced driver-assistance tasks based on inputs from the at least one sensor;

a memory channel connected to the processor; and a module comprising:

an interface connected to the memory channel to provide memory services to the processor;

a random access memory;

a non-volatile memory cell array; and a controller configured to detect a trigger event, and in response:

identify a sequence of commands received in the interface from the memory channel to access memory services provided via at least the random access memory;

generate a classification of the sequence of commands from computations of an artificial neural network, wherein the artificial neural network is responsive to the sequence of commands as an input to generate the classification of the sequence as an output of the artificial neural network, and wherein the computations of the artificial neural network include one or more operations of multiplication and accumulation performed using the non-volatile memory cell array; and provide, via the interface, the classification that is generated by the artificial neural network in response to receiving the sequence of commands.

19. The computing system of claim 18, wherein a portion of the non-volatile memory cell array is programmed in a mode to store weight matrices of the artificial neural network; the mode is configured to facilitate operations of multiplication and accumulation; the artificial neural network is trained to classify the sequence of commands as a first type of known attacks, a second type of normal operations, or a third type of anomalous operations of an unknown type; and the artificial neural network includes at least a recurrent neural network (RNN), a long short term memory (LSTM) network, or an attention-based neural network.

20. The computing system of claim 19, wherein the processor is further configured to generate a warning or an alert in the infotainment system, in response to the classification is the first type of known attacks, or the third type of anomalous operations of an unknown type.

* * * * *